United States Patent
Amano et al.

(10) Patent No.: US 9,170,832 B2
(45) Date of Patent: Oct. 27, 2015

(54) VIRTUAL MACHINE CONTROL APPARATUS AND VIRTUAL MACHINE CONTROL METHOD

(71) Applicant: Panasonic Intellectual Property Corporation of America, Torrance, CA (US)

(72) Inventors: Katsushige Amano, Kyoto (JP); Masahiko Saito, Osaka (JP); Tadao Tanikawa, Osaka (JP); Takuya Kondoh, Kanagawa (JP); Toshiaki Takeuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 127 days.

(21) Appl. No.: 13/989,900

(22) PCT Filed: Jan. 25, 2013

(86) PCT No.: PCT/JP2013/000384
§ 371 (c)(1),
(2) Date: May 28, 2013

(87) PCT Pub. No.: WO2013/125160
PCT Pub. Date: Aug. 29, 2013

(65) Prior Publication Data
US 2014/0196034 A1    Jul. 10, 2014

(30) Foreign Application Priority Data

Feb. 22, 2012  (JP) .................................. 2012-036011

(51) Int. Cl.
G06F 9/455    (2006.01)
G05D 17/00    (2006.01)
G06Q 50/06    (2012.01)
G06F 1/32     (2006.01)
G06F 9/48     (2006.01)

(52) U.S. Cl.
CPC .......... *G06F 9/45533* (2013.01); *G06F 1/3203* (2013.01); *G06F 9/45537* (2013.01); *G06F 9/485* (2013.01); *G06Q 50/06* (2013.01)

(58) Field of Classification Search
CPC ........................... G06G 9/45537; G06Q 50/06
USPC ........................................................ 700/298
See application file for complete search history.

(56) References Cited

U.S. PATENT DOCUMENTS 8,051,434 B2 * 11/2011 Miyata ........................ 719/321

FOREIGN PATENT DOCUMENTS

JP    2008-46887    2/2008
JP    2012-18515    1/2012
WO   2008/149412   12/2008

OTHER PUBLICATIONS

International Search Report issued Feb. 26, 2013 in International (PCT) Application No. PCT/JP2013/000384.

*Primary Examiner* — Camquy Truong
(74) *Attorney, Agent, or Firm* — Wenderoth, Lind & Ponack, L.L.P.

(57) ABSTRACT

A virtual machine control apparatus 100 controls execution of a first type virtual machine A210 and a second type virtual machine 220. The first type virtual machine A210 includes a start detection unit 261 which detects an operation in the first type virtual machine A210 to start usage of a device (external storage device 160). The first type virtual machine A210 also includes a start signal output unit 262 which outputs a start signal when the start detection unit 261 detects the operation to start usage of the device. The second type virtual machine 220 includes a control unit (external storage device driver 272) which, when the start signal output unit 262 outputs the start signal while the device is in set in a low power mode (electrical power set to off), sets the device in a normal mode (electrical power set to on).

13 Claims, 23 Drawing Sheets

VIRTUAL MACHINE CONTROL APPARATUS AND VIRTUAL MACHINE CONTROL METHOD

TECHNICAL FIELD

The present invention relates to a virtual machine control apparatus for implementing virtual machines that use a device.

BACKGROUND ART

A virtual machine control apparatus that implements a plurality of virtual machines operating independently of one another is a known art. For example, Patent Literature 1 discloses an OS (Operating System) switching apparatus, which is one example of the above type of virtual machine control apparatus.

In a situation where the plurality of virtual machines operating independently of one another share use of a device, when more than one of the virtual machines performs an operation to control the device, a race condition for control of the device occurs therebetween, and consequently there is a possibility that the device cannot be used correctly.

Therefore, in a situation such as described above, generally only one of the virtual machines (referred to below as virtual machine A) has a device control unit for controlling the device. When any of the other virtual machines is to use the device, the other virtual machine uses the device by requesting the virtual machine A to control the device.

CITATION LIST

Patent Literature

[Patent Literature 1] Japanese Patent Application Publication No. 2008-46887

SUMMARY OF INVENTION

Technical Problem

There is a demand to reduce electrical power consumed by a system while the system is being used.

The present invention has been achieved in response to the above demand, and aims to provide a virtual machine control apparatus that reduces electrical power consumption of a system which includes a plurality of virtual machines implemented by the virtual machine control apparatus and a device used by the virtual machine control apparatus.

Solution to Problem

In order to solve the above problem, one aspect of the present invention is a virtual machine control apparatus comprising: a processor configured to use a device settable in either a normal mode or a low power mode having lower electrical power consumption per unit time and lower processing ability than the normal mode; and a memory configured to store therein a program executable by the processor, the virtual machine control apparatus, through execution by the processor of the program stored in the memory, implementing: one or more first type virtual machines; one second type virtual machine; and a hypervisor configured to control execution of each of the first type virtual machines and the second type virtual machine, wherein each of the first type virtual machines includes: a start detection unit configured to detect an operation in the first type virtual machine to start usage of the device; and a start signal output unit configured to output a start signal when the start detection unit detects the operation to start usage of the device, and the second type virtual machine includes a device control unit configured to set the device in the normal mode when, while the device is set in the low power mode, the start signal output unit outputs the start signal.

Advantageous Effects of Invention

According to the configuration of the above virtual machine control apparatus which is one aspect of the present invention, when any one of the first type virtual machines performs an operation to start usage of the device, the second type virtual machine, which includes the device control unit, changes the device from the low power mode to the normal mode. As a consequence of the above, the device can be kept in the low power mode until the first type virtual machine, which uses the device in the normal mode, starts usage of the device.

Consequently, through the virtual machine control apparatus described above, electrical power consumption can be reduced for the system which includes the plurality of virtual machines implemented by the virtual machine control apparatus and the device used by the virtual machine control apparatus.

DESCRIPTION OF EMBODIMENTS

First Embodiment

<Overview>

The following describes as one embodiment of the virtual machine control apparatus relating to the present invention, a virtual machine control apparatus that implements a plurality of first type virtual machines which each include a task that uses an external storage device (which is an example of an external device), a second type virtual machine which includes a device driver for the external storage device, and a hypervisor which controls execution of each of the first type virtual machines and the second type virtual machine.

In the virtual machine control apparatus, when a task included in any one of the first type virtual machines performs an operation to start usage of the external storage device while electrical power to the external storage device is set to off and the second type virtual machine is in a suspended state (where the second type virtual machine is not a target for execution by the hypervisor), the first type virtual machine detects the operation to start usage of the external storage device by the task, and outputs a start signal to the hypervisor. Subsequently, the hypervisor causes the second type virtual machine to resume to an executed state (where the second type virtual machine is a target for execution by the hypervisor), and outputs a start notification signal to the second type virtual machine indicating that the start signal has been output by the one first type virtual machine. After the above, the second type virtual machine operates the external storage device, setting electrical power to the external storage device to on.

Also, when a task included in any one of the first type virtual machines performs an operation to terminate usage of the external storage device while the external storage device is in an operational state and the second type virtual machine is in the executed state, the one first type virtual machine detects the operation to terminate usage of the external storage device by the task, and outputs a termination signal to the hypervisor. Subsequently, if none of the other first type virtual machines is using the external storage device, the hypervisor outputs a termination notification signal to the second type virtual machine indicating that the termination signal has been output by the one first type virtual machine. After the above, the second type virtual machine suspends the external storage device, setting electrical power to the external storage device to off. The hypervisor subsequently sets the second type virtual machine in the suspended state.

Herein, phrases such as "output a signal" are used to explain sending and receiving of data or the like, however the above phrasing does not limit the sending and receiving of data or the like to being through output of physical signals.

Configuration of the virtual machine control apparatus is explained below with reference to the drawings.

<Configuration>

Figure 1:
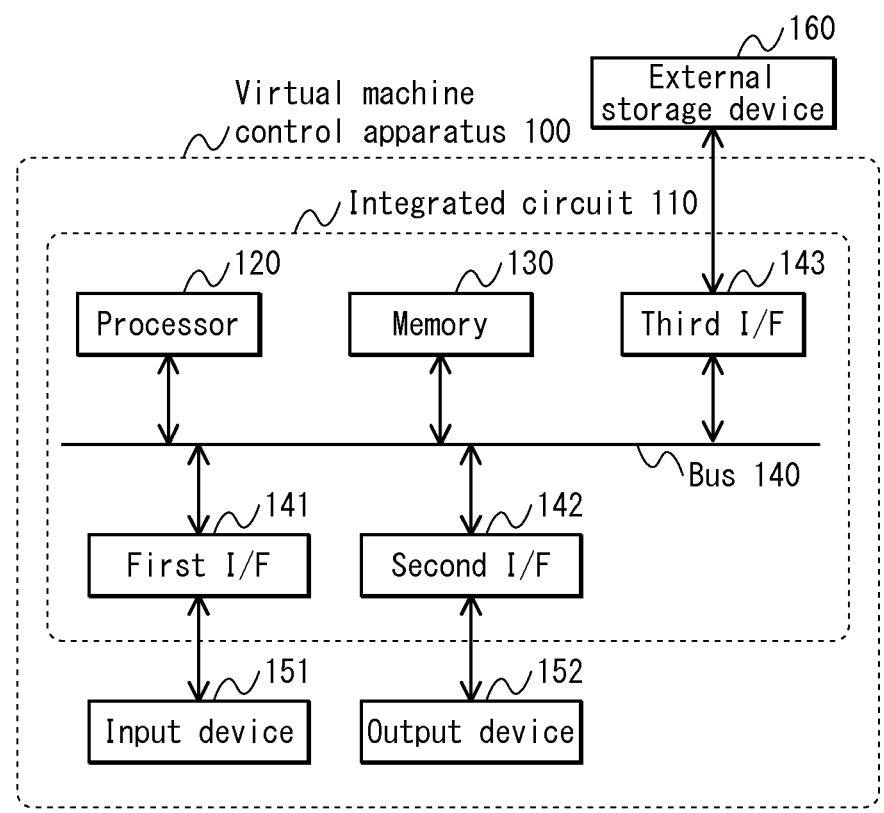
FIG. 1 is a block diagram showing an overview of hardware configuration of a virtual machine control apparatus 100.

FIG. 1 is a block diagram showing an overview of hardware configuration of a virtual machine control apparatus 100.

As shown in FIG. 1, hardware configuration of the virtual machine control apparatus 100 is that of a computer configured by an integrated circuit 110, an input device 151 and an output device 152, and connected to an external storage device 160. The integrated circuit 110 is configured by a processor 120, a memory 130, a bus 140, a first I/F (Interface) 141, a second I/F 142, and a third I/F 143.

The memory 130 is configured by a ROM (Read Only Memory) and a RAM (Random Access Memory). The memory 130 is connected to the bus 140, and stores therein programs for regulating operation of the processor 120 and data used by the processor 120.

The bus 140 is connected to the processor 120, the memory 130, the first I/F 141, the second I/F 142 and the third I/F 143. The bus 140 has a function of transmitting signals between circuits connected thereto.

The first I/F 141 is connected to the bus 140 and the input device 151. The second I/F 142 is connected to the bus 140 and the output device 152. The third I/F 143 is connected to the bus 140 and the external storage device 160. The first I/F 141, the second I/F 142, and the third I/F 143 each have a function of mediating signal transmission between circuits connected thereto.

The input device 151 is configured by a keyboard, mouse or the like, and is connected to the first I/F 141. The input device 151 is controlled by execution of a program by the processor 120, and has a function of receiving an operation command from a user of the virtual machine control apparatus 100.

The output device 152 is configured for example by a display and is connected to the second I/F 142. The output device 152 is controlled by execution of a program by the processor 120 and has a function of displaying lines of text, images and the like based on a signal sent from the processor 120.

The processor 120 is connected to the bus 140, and controls the input device 151, the output device 152, and the external storage device 160 by execution of a program stored in the memory 130. The processor 120 has a function of causing the virtual machine control apparatus 100 to function as a computer that implements first type virtual machines, a second type virtual machine, and a hypervisor that controls execution of each of the first type virtual machines and the second type virtual machine. The processor 120 controls the virtual machine control apparatus 100 by execution of a program stored in the memory 130, thus causing the virtual machine control apparatus 100 to execute processing for starting device usage and processing for terminating device usage which are operations which are features of the virtual machine control apparatus 100. The processing for starting device usage and the processing for terminating device usage are explained with reference to the flowcharts further below.

The external storage device 160 is connected to the third I/F 143 and is controlled by execution of a program by the processor 120. The external storage device 160 has a function of writing data to a flash memory contained therein and also a function of reading data from the flash memory.

Functional configuration of the virtual machine control apparatus 100, which has the hardware configuration described above, is explained below with reference to the drawings.

Figure 2:
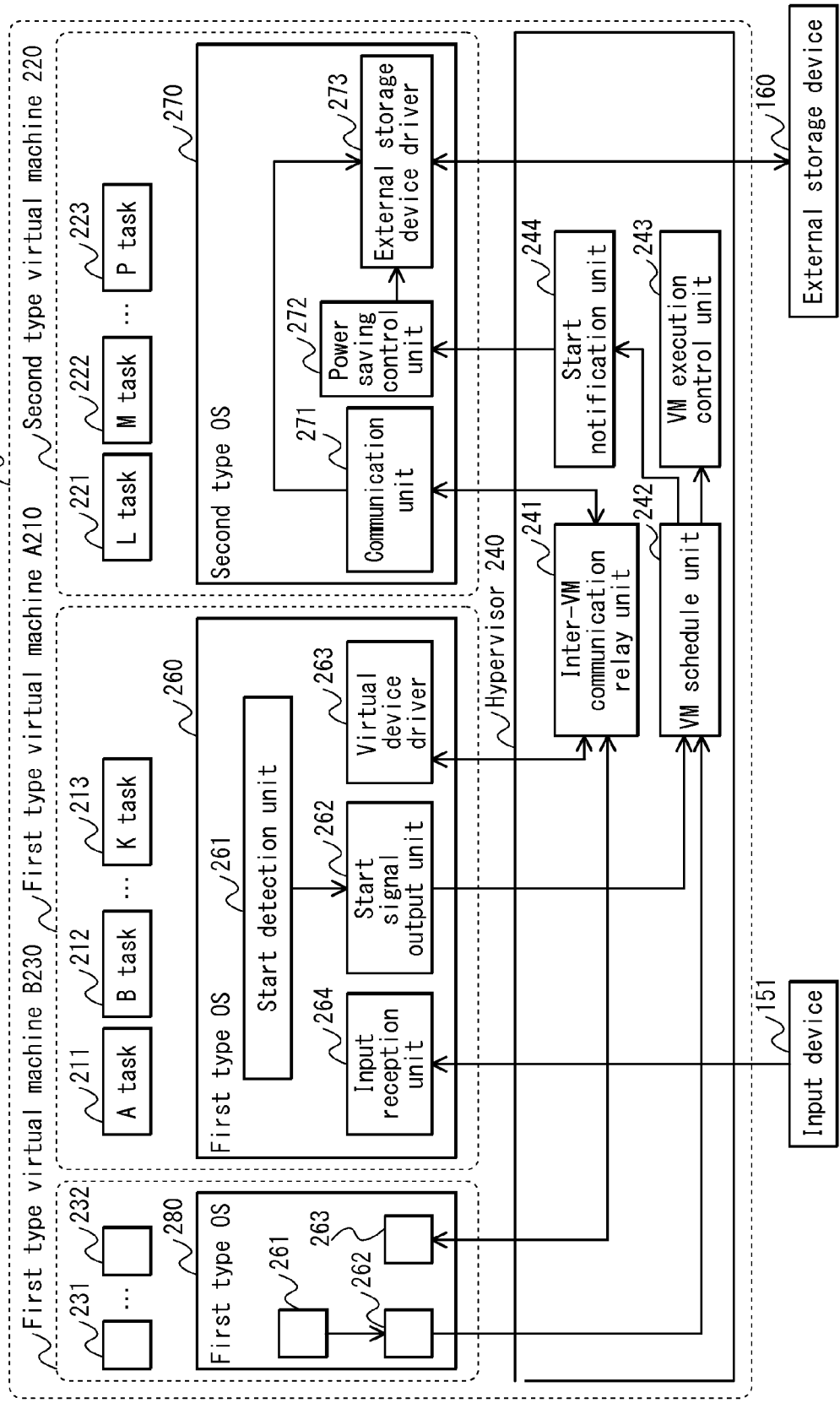
FIG. 2 is a schematic diagram showing a module group 200 which is a target for execution by a processor 120.

FIG. 2 is a schematic diagram showing a program module (referred to below as simply a module) group 200, which is a target for execution by the processor 120.

As shown in FIG. 2, the module which is a target for execution by the processor 120 includes a hypervisor 240, and also a first type OS 260, a second type OS 270, and a first type OS 280, execution of which is controlled by the hypervisor 240. The module further includes A-K tasks 211-213, L-P tasks 221-223, and Q-Z tasks 231-232, execution of which is respectively controlled by the first type OS 260, the second type OS 270 and the first type OS 280.

Herein, a system formed from the first type OS 260 and the group of tasks of which execution is controlled by the first type OS 260, functions as a first type virtual machine A210. Likewise, a system formed from the second type OS 270 and the group of tasks of which execution is controlled by the second type OS 270, functions as a second type virtual machine 220, and a system formed from the first type OS 280 and the group of tasks of which execution is controlled by the first type OS 280, functions as a first type virtual machine B230.

The hypervisor 240 includes an inter-VM (Virtual Machine) communication relay unit 241, a VM schedule unit 242, a VM execution control unit 243 and a start notification unit 244. The hypervisor 240 has a function of controlling execution of the first type OS 260, the second type OS 270 and the first type OS 280. In other words, the hypervisor 240 has a function of controlling execution of the first type virtual machine A210, the second type virtual machine 220 and the first type virtual machine B230.

The first type OS 260 includes a start detection unit 261, a start signal output unit 262, a virtual device driver 263 and an input reception unit 264. The first type OS 260 has a function of controlling execution of the A-K tasks 211-213.

The first type OS 280 includes a start detection unit 261, a start signal output unit 262 and a virtual device driver 263. The first type OS 280 has a function of controlling execution of the Q-Z tasks 231-232.

Herein, an OS that includes at least a start detection unit 261, a start signal output unit 262 and a virtual device driver 263 is referred to as a first type OS.

The second type OS 270 includes a communication unit 271, a power saving control unit 272 and an external storage device driver 273. The second type OS 270 has function of controlling execution of the L-P tasks 221-223.

Herein, an OS that includes at least a communication unit 271, a power saving control unit 272 and an external storage device driver 273 is referred to as a second type OS.

The start detection unit 261 is connected to the start signal output unit 262 and has two functions as explained below.

One function is a start detection function of detecting when an open command, which is executed when starting usage of the external storage device 160, becomes a target for execution in a task (herein, any of the A-K tasks 211-213) executed by the first type virtual machine A210.

Explanation of function of the start detection unit 261 continues further below, but the following explains a procedure for the task to use the external storage device 160.

In order to use the external storage device 160, the task first executes the open command and announces start of usage of the external storage device 160. Subsequently, the task executes a command group for actual use of the external storage device 160 (for example a read command or a write command). After completion of execution of the command group, the task executes a close command and announces termination of usage of the external storage device 160.

The following is a continuation of explanation of functions of the start detection unit 261.

The other function is a termination detection function of detecting when the close command, which is executed when terminating usage of the external storage device 160, becomes a target for execution in any task executed by the first type virtual machine A210.

The start signal output unit 262 is connected to the start detection unit 261 and the VM schedule unit 242, and has two functions as explained below.

One function is a start signal output function of when the start detection unit 261 detects that the open command becomes a target for execution, outputting a start signal to the VM schedule unit 242 indicating an operation to start usage of the external storage device 160.

The other function is a termination signal output function of when the start detection unit 261 detects that the close command becomes a target for execution, outputting a termination signal to the VM schedule unit 242 indicating an operation to terminate usage of the external storage device 160.

The virtual device driver 263 is connected to the inter-VM communication relay unit 241 and has two functions as explained below.

One function is a device driver control signal generation function of when a command for usage of the external storage device 160 is executed in a task executed by the first type virtual machine A210, outputting a device driver control signal for controlling the external storage device driver 273 to the communication unit 271 via the inter-VM communication relay unit 241. The device driver control signal is for controlling the external storage device driver 273 to output a control signal to the external storage device 160 that causes the external storage device 160 to perform an operation corresponding to the command.

The other function is a device response signal notification function of when a device response signal corresponding to the device driver control signal is received from the communication unit 271, outputting the device response signal to the task which is a response target thereof.

For the virtual device driver 263, an interface with regards to execution of the task by the first type virtual machine A210 is the same as for the external storage device driver 273. Therefore, the task executed by the first type virtual machine A210 does not distinguish between the virtual device driver 263 and the external storage device driver 273.

The input reception unit 264 is connected to the input device 151. The input reception unit 264 has a function of receiving an operation command pertaining to the first type virtual machine A210, which is input by the user through use of the input device 151.

The inter-VM communication relay unit 241 is connected to the virtual device driver 263 included in the first type OS 260, the virtual device driver 263 included in the first type OS 280, and the communication unit 271. The inter-VM communication relay unit 241 has a function of relaying signals used in inter-OS communications.

The VM schedule unit 242 is connected to the start signal output unit 262 included in the first type OS 260, the start signal output unit 262 included in the first type OS 280, the VM execution control unit 243 and the start notification unit 244. The VM schedule unit 242 has three functions as explained below.

One function is a VM scheduling function of performing scheduling using a time division method for any OS which is a target for execution control.

Another function is a type two virtual machine resumption function of performing OS scheduling so that the second type OS 270 is changed to being a target for execution when, while scheduling is being performed so that the second type OS 270 is not a target for execution (i.e. when the second type OS 270 is in a suspension mode), the start signal output unit 262 included in any first type OS (the first type OS 260 or the first type OS 280) outputs the start signal.

Another function is a type two virtual machine suspension function of performing OS scheduling so that the second type OS 270 is changed to not being a target for execution (the second type OS 270 is changed to being in a so called run mode or ready mode) after waiting for a set time T1. The above function is performed when, while scheduling is being performed so that the second type OS 270 is a target for execution, for every first type OS in which the start signal output unit 262 included therein outputs the start signal at least once, the start signal output unit 262 outputs the termination signal after a most recent output of the start signal from the start signal output unit 262. The set time T1 is determined in advance to be at least as long as an amount of time required during processing for terminating device usage (refer to FIG. 4) between processing in Step S440 starting and processing in Step S460 being completed (an amount of time required for suspension of the external storage device 160). The processing for terminating device usage is explained further below.

The VM execution control unit 243 is connected to the VM schedule unit 242. The VM execution control unit 243 has a function of controlling OS execution based on scheduling by the VM schedule unit 242. Below, controlling OS execution so that the second type OS 270 is a target for execution is referred to as an execution control mode of the second type virtual machine 220 being set in execution mode, and controlling OS execution so that the second type OS 270 is not a target for execution is referred to as the execution control mode of the second type virtual machine 220 being set in suspension mode.

The start notification unit 244 is connected to the VM schedule unit 242 and the power saving control unit 272, and has two functions as explained below.

One function is a start notification function of outputting a start notification signal to the power saving control unit 272. The above function is performed when, while the execution control mode of the second type virtual machine 220 is set in the suspension mode, the execution control mode is set in the execution mode due to the start signal output unit 262 included in any first type OS (the first type OS 260 or the first type OS 280 in the present embodiment) outputting the start signal.

The other function is a termination notification function of outputting a termination notification signal to the power saving control unit 272. The above function is performed when, while the execution control mode of the second type virtual machine 220 is set in the execution mode, for every first type OS in which the start signal output unit 262 included therein outputs the start signal at least once, the start signal output unit 262 outputs the termination signal after a most recent output of the start signal from the start signal output unit 262.

The communication unit 271 is connected to the inter-VM communication relay unit 241 and the external storage device driver 273, and has two functions as explained below.

One function is a first communication function of receiving the device driver control signal transmitted from the virtual device driver 263 to the communication unit 271 via the inter-VM communication relay unit 241, and subsequently outputting the device driver control signal to the external storage device driver 273.

The other function is a second communication function of receiving a device response signal transmitted from the external storage device driver 273 after transmission of the device response signal from the external storage device 160 to the external storage device driver 273 in response to control of the external storage device 160 by the external storage device driver 273. The communication unit 271 outputs the device response signal to the virtual device driver 263 in whichever of the first type virtual machines is a response target thereof.

The power saving control unit 272 is connected to the start notification unit 244 and the external storage device driver 273, and has two functions as explained below.

One function is an operation command function of when the start notification signal is transmitted from the start notification unit 244, outputting an operation command signal to the external storage device driver 273 commanding the external storage device driver 273 to operate the external storage device 160. In other words, the external storage device driver 273 is commanded to set electrical power to the external storage device 160 to on, putting the external storage device 160 in a usable state.

The other function is a suspension command function of when the termination notification signal is transmitted from the start notification unit 244, outputting a suspension command signal to the external storage device driver 273 commanding the external storage device driver 273 to suspend the external storage device 160. In other words, the external storage device driver 273 is commanded to set electrical power to the external storage device 160 to off, putting the external storage device 160 in a non-usable state.

The external storage device driver 273 is connected to the communication unit 271, the power saving control unit 272 and the external storage device 160, and has four functions as explained below.

One function is an external storage device control function of when the device driver control signal is transmitted from the communication unit 271, controlling the external storage device 160 in accordance with the device driver control signal.

Another function is an external storage device response function of when the device response signal is transmitted from the external storage device 160 in response to control of the external storage device 160, outputting the device response signal to the communication unit 271.

Another function is an external storage device operation function of when the operation command signal is transmitted from the power saving control unit 272 while the external storage device 160 is suspended, setting electrical power to the external storage device 160 to on and operating the external storage device 160.

Another function is an external storage device suspension function of when the suspension command signal is transmitted from the power saving control unit 272 while the external storage device 160 is operated, setting electrical power to the external storage device 160 to off and suspending the external storage device 160.

The following explains with reference to the drawings, operation of the virtual machine control apparatus 100 having the configuration explained above.

<Operation>

A specific feature of operation of the virtual machine control apparatus 100 is processing for starting device usage which is performed when, while electrical power to the external storage device 160 is set to off and the execution control mode of the second type virtual machine 220 is in the suspension mode, an open command which is executed when starting usage of the external storage device 160, becomes a target for execution in a task executed by any of the first type virtual machines. Through execution of the processing for starting device usage which is explained further below, (i) the execution control mode of the second type virtual machine 220 is set in the execution mode, and (ii) electrical power to the external storage device 160 is set to on.

Another specific feature of operation of the virtual machine control apparatus 100 is processing for terminating device usage which is performed when, while electrical power to the external storage device 160 is set to on and the execution control mode of the second type virtual machine 220 is set in the execution mode, for every first type virtual machine in which the start signal output unit 262 included therein outputs the start signal at least once, the start signal output unit 262 outputs the termination signal after a most recent output of the start signal by the start signal output unit 262. Through execution of the processing for terminating device usage which is explained further below, (i) electrical power to the external storage device 160 is set to off, and (ii) the execution control mode of the second type virtual machine 220 is set in the suspension mode.

The following explains the processing for starting device usage and the processing for terminating device usage.

<Processing for Starting Device Usage>

Figure 3:
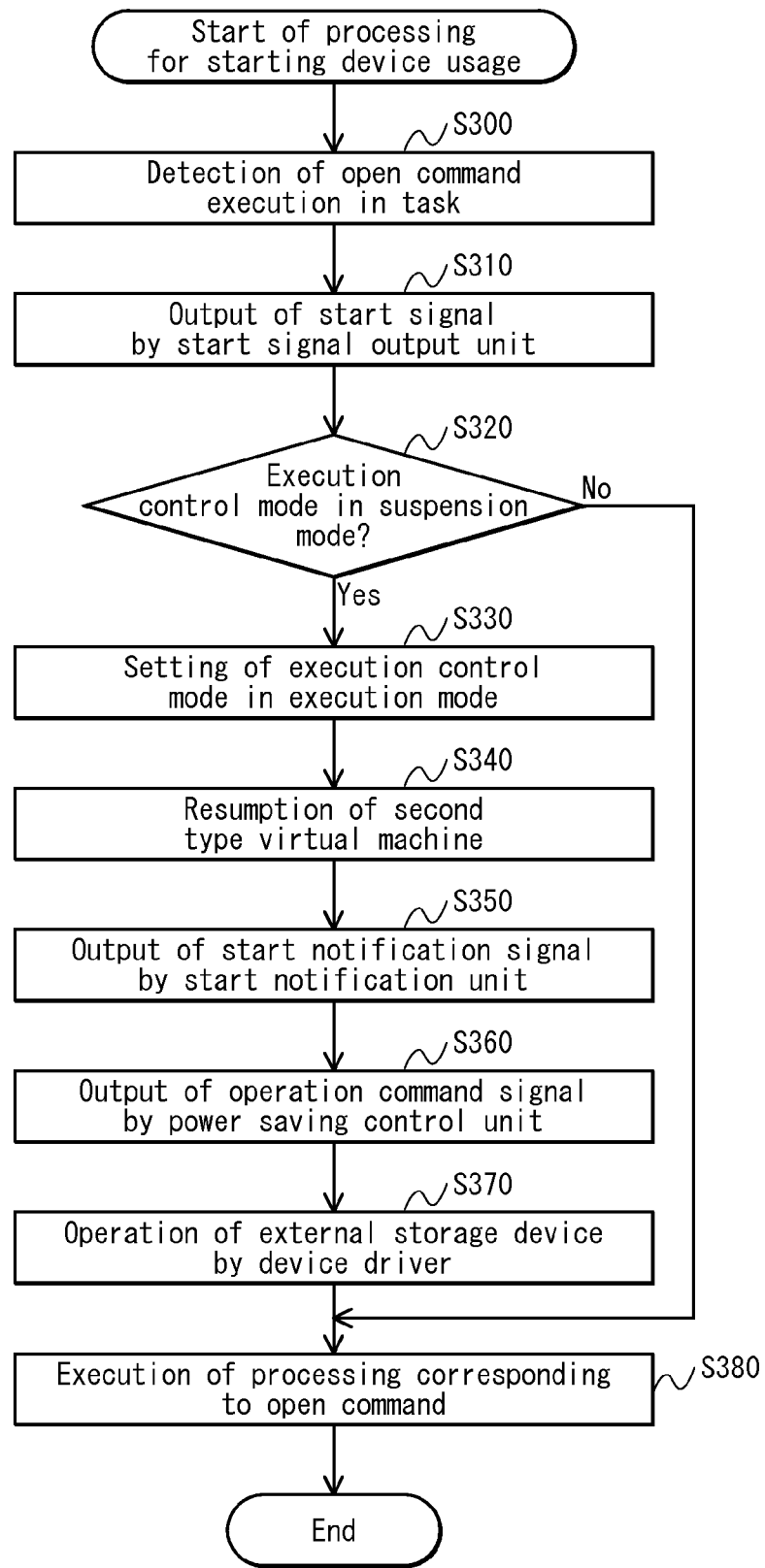
FIG. 3 is a flowchart of processing for starting device usage.

FIG. 3 is a flowchart of the processing for starting device usage.

The processing for starting device usage starts when, while electrical power to the external storage device 160 is set to off, an open command which is executed when starting usage of the external storage device 160, becomes a target for execution in a task executed by any of the first type virtual machines (in the explanation below the first type virtual machine is the first type virtual machine A210).

When the processing for starting device usage starts, the start detection unit 261 detects that the open command has become a target for execution in the task executed by the first type virtual machine A210 (Step S300). Subsequently, the start signal output unit 262 outputs a start signal to the VM schedule unit 242 (Step S310).

When the start signal output unit 262 outputs the start signal, the VM schedule unit 242 checks whether the execution control mode of the second type virtual machine 220 is set in the suspension mode (Step S320).

If in processing in Step S320 the execution control mode of the second type virtual machine 220 is set in the suspension mode (Step S320: Yes), the VM schedule unit 242 sets the execution control mode of the second type virtual machine 220 in the execution mode by performing OS scheduling so that the second type OS 270 is changed to being a target for execution (Step S330).

Once the execution control mode of the second type virtual machine 220 is set in the execution mode, the VM execution control unit 243 resumes the second type virtual machine 220 by controlling virtual machine execution so that the second type virtual machine 220 becomes a target for execution (Step S340). Subsequently, the start notification unit 244 outputs a start notification signal to the power saving control unit 272 (Step S350).

When the start notification unit 244 outputs the start notification signal, the power saving control unit 272 outputs an operation command signal to the external storage device driver 273, commanding the external storage device driver 273 to operate the external storage device 160 (Step S360).

When the power saving control unit 272 outputs the operation command signal, the external storage device driver 273 operates the external storage device 160 (Step S370).

Upon completion of processing in Step S370 or if in processing in Step S320 the execution control mode of the second type virtual machine 220 is not set in the suspension mode (Step S320: No), the external storage device 160 is operated in a usable state and the first type OS 260 executes processing corresponding to the open command, thus ending the processing for starting device usage.

<Processing for Terminating Device Usage>

Figure 4:
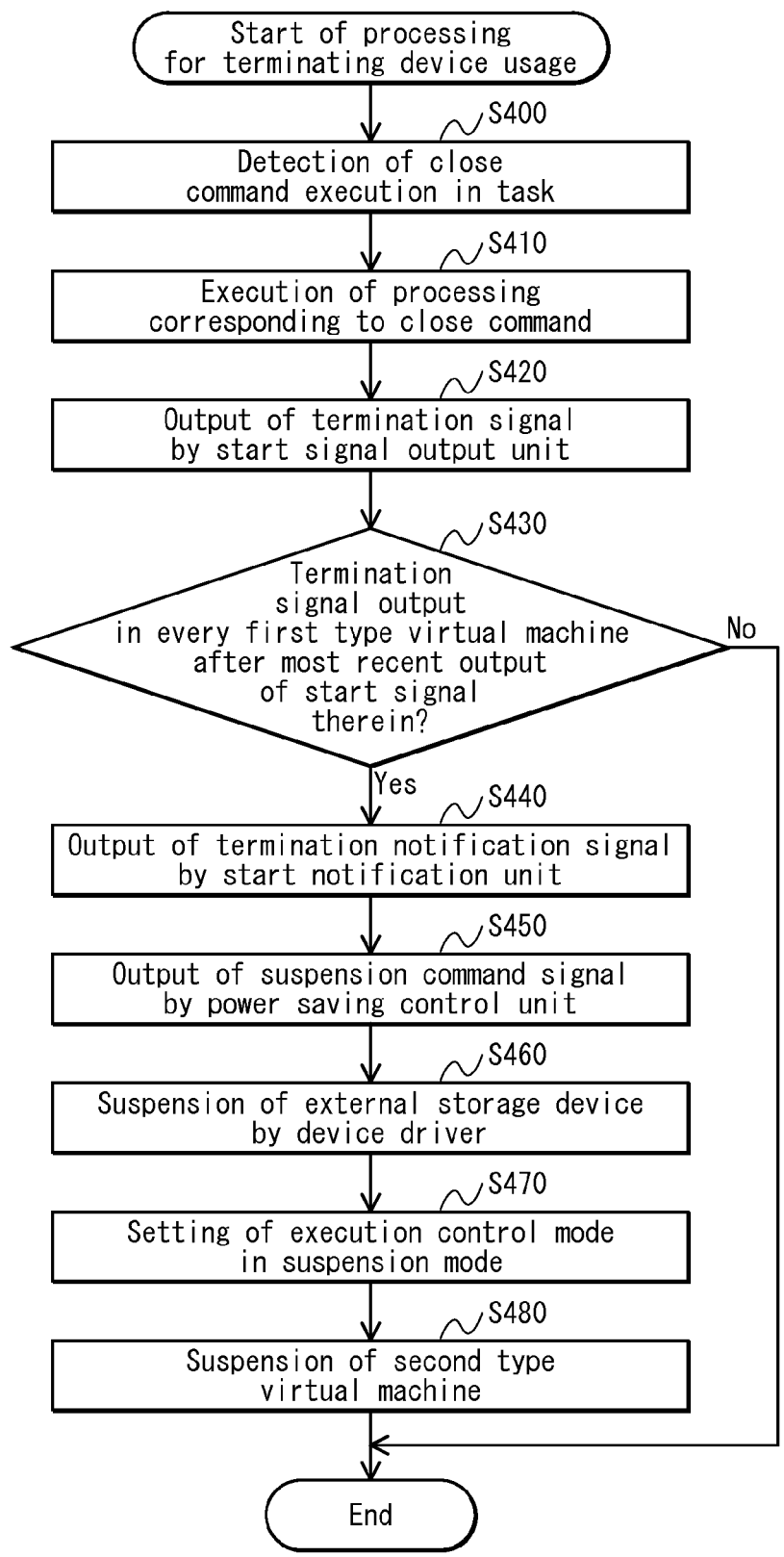
FIG. 4 is a flowchart of processing for terminating device usage.

FIG. 4 is a flowchart of the processing for terminating device usage.

The processing for terminating device usage starts when, while electrical power to the external storage device 160 is set to on and the execution control mode of the second type virtual machine 220 is set in the execution mode, a close command which is executed when terminating usage of the external storage device 160, becomes a target for execution in a task executed by any of the first type virtual machines (in the explanation below the first type virtual machine is the first type virtual machine A210).

When the processing for terminating device usage starts, the start detection unit 261 detects that the close command has become a target for execution in the task executed by the first type virtual machine A210 (Step S400). At the time of Step S400 the external storage device 160 is in a usable state, thus the first type OS 260 which includes the start detection unit 261 therein, executes processing corresponding to the close command (Step S410). Once the processing corresponding to the close command has been performed by the first type OS 260, the start signal output unit 262 outputs a termination signal to the VM schedule unit 242 (Step S420).

When the start signal output unit 262 outputs the termination signal, the VM schedule unit 242 checks whether for every first type OS in which the start signal output unit 262 included therein outputs a start signal at least once, the start signal output unit 262 outputs a termination signal after a most recent output of a start signal by the start signal output unit 262 (Step S430).

If in processing in Step S430, for every first type OS in which the start signal output unit 262 included therein outputs the start signal at least once, the start signal output unit 262 outputs the termination signal after a most recent output of the start signal by the start signal output unit 262 (Step S430: Yes), the start notification unit 244 outputs a termination notification signal to the power saving control unit 272 (Step S440).

When the start notification unit 244 outputs the termination notification signal, the power saving control unit 272 outputs a suspension command signal to the external storage device driver 273, commanding the external storage device driver 273 to suspend the external storage device 160 (Step S450).

When the power saving control unit 272 outputs the suspension command signal, the external storage device driver 273 suspends the external storage device 160 (Step S460).

Once processing in Step S460 is completed and the set time T1 has passed since processing in Step S440 started, the VM schedule unit 242 sets the execution control mode of the second type virtual machine 220 in the suspension mode by performing OS scheduling so that the second type OS 270 is changed to not being a target for execution (Step S470).

Once the execution control mode of the second type virtual machine 220 is set in the suspension mode, the VM execution control unit 243 suspends the second type virtual machine 220 by controlling virtual machine execution so that the second type virtual machine 220 is no longer a target for execution (S480).

Once the processing in Step S480 is completed, the virtual machine control apparatus 100 ends the processing for terminating device usage.

<Conclusion>

In the virtual machine control apparatus 100 which is configured as described above, electrical power to the external storage device 160 is set to on during a period from a point in time at which any of the first type virtual machines starts usage of the external storage device 160, until a point in time at which all of the first type virtual machines have terminated usage of the external storage device 160, and electrical power to the external storage device 160 is set to off at all times other than during the above period.

Therefore, through the above configuration, electrical power consumption of the system including the virtual machine control apparatus 100 and the external storage device 160 can be reduced to a relatively low level.

Second Embodiment

<Overview>

The following explains as one embodiment of the virtual machine control apparatus relating to the present invention, a first modified virtual machine control apparatus which is a partial modification of the virtual machine control apparatus 100 relating to the first embodiment.

The virtual machine control apparatus 100 relating to the first embodiment is an example of a configuration wherein when an open command, which is executed when starting usage of the external storage device 160, becomes a target for execution in a task executed by any one of the first type virtual machines while electrical power to the external storage device 160 is set to off, electrical power to the external storage device 160 is set to on.

In contrast to the above, the first modified virtual machine control apparatus relating to a second embodiment is an example of a configuration wherein when an open command, which is executed when starting usage of the external storage device 160, becomes a target for execution in a task which is executed by any one of the first type virtual machines while electrical power to the external storage device 160 is set to off, electrical power to the external storage device 160 is only set to on if the task is a task which has been authorized in advance to use the external storage device 160.

Configuration of the first modified virtual machine control apparatus relating to the second embodiment is explained below with reference to the drawings. Explanation focuses on differences compared to the virtual machine control apparatus 100 relating to the first embodiment.

<Configuration>

Hardware configuration of the first modified virtual machine control apparatus is not modified relative to the virtual machine control apparatus 100 relating to the first embodiment, but software executed by the processor 120 is partially modified relative to the virtual machine control apparatus 100.

Figure 5:
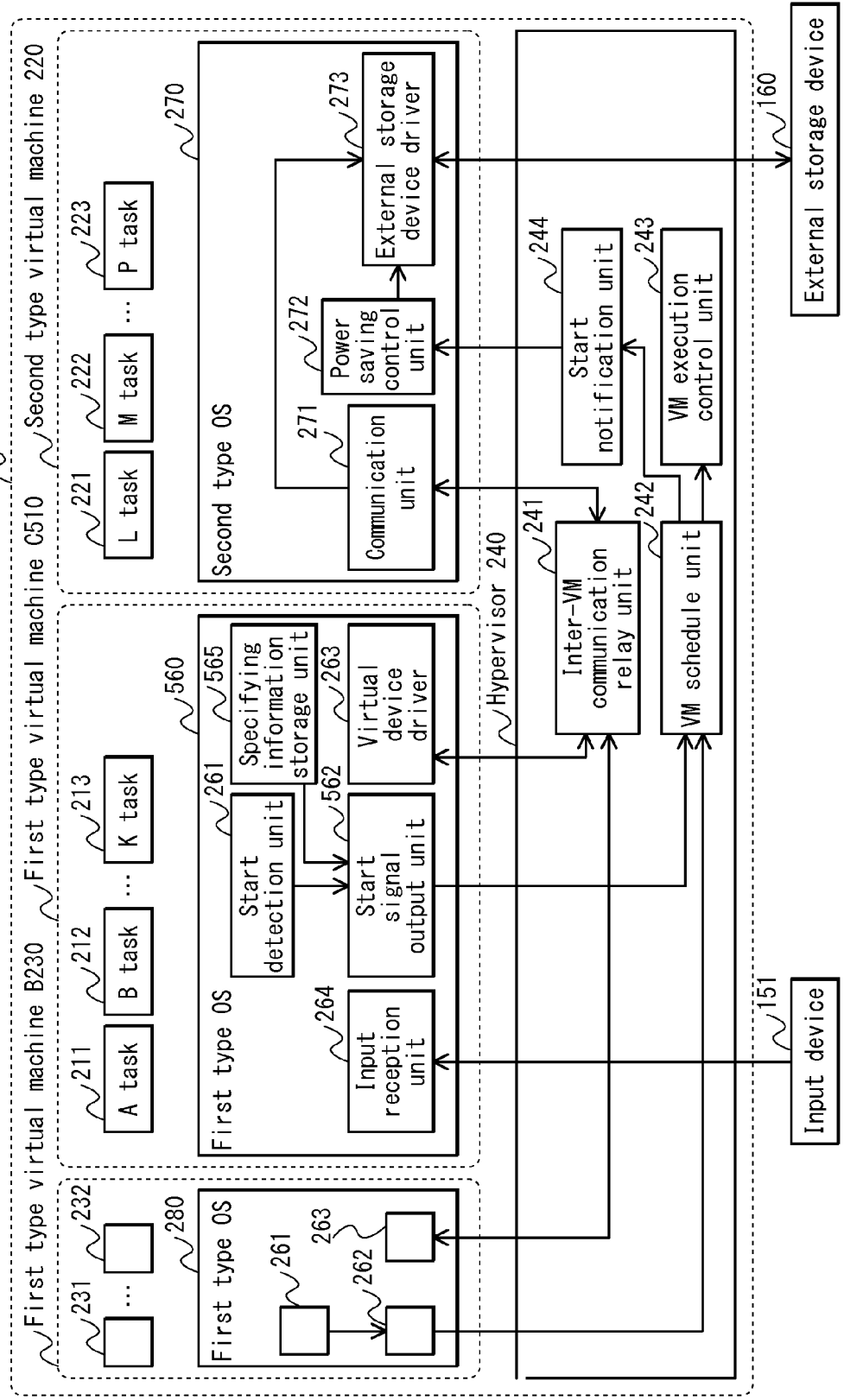
FIG. 5 is a schematic diagram showing a module group 500 which is a target for execution by the processor 120.

FIG. 5 is a schematic diagram showing a module group 500 which is a target for execution by the processor 120.

As shown in FIG. 5, the module group 500 is modified relative to the module group 200 relating to the first embodiment (refer to FIG. 2) by addition of a specifying information storage unit 565 and modification of the start signal output unit 262 to a start signal output unit 562. In accordance with the above modification the first type OS 260 is modified to a first type OS 560 and the first type virtual machine A210 is modified to a first type virtual machine C510.

The specifying information storage unit 565 is connected to the start signal output unit 562 and is included in the first type OS 560. The specifying information storage unit 565 has a function of storing therein specifying information for specifying among tasks of which execution is controlled by the first type virtual machine C510, tasks which are authorized in advance to use the external storage device 160.

The start signal output unit 562 is connected to the start detection unit 261, the VM schedule unit 242 and the specifying information storage unit 565, and is included in the first type OS 560. The start signal output unit 562 has four functions as explained below.

One function is a modified start signal output function of outputting a start signal to the VM schedule unit 242 indicating an operation to start usage of the external storage device 160. The above function is performed when the start detection unit 261 detects that an open command becomes a target for execution, if a task including the open command is specified by the specifying information stored in the specifying information storage unit 565 as a task which is authorized in advance to use the external storage device 160.

Another function is an open error processing function which is performed when the start detection unit 261 detects that the open command becomes a target for execution, if the task including the open command is not specified by the specifying information stored in the specifying information storage unit 565 as a task which is authorized in advance to use the external storage device 160. In the open error processing function, the start signal output unit 562 causes the OS which includes the start signal output unit 562 therein to execute predetermined open error processing instead of executing the open command.

Another function is a modified termination signal output function which is performed when the start detection unit 261 detects that a close command becomes a target for execution, if a task including the close command is specified by the specifying information stored in the specifying information storage unit 565 as a task which is authorized in advance to use the external storage device 160. In the modified termination signal output function, once the OS including the start signal output unit 562 completes execution of processing corresponding to the close command, the start signal output unit 562 outputs a termination signal to the VM schedule unit 242 indicating an operation to terminate usage of the external storage device 160.

Another function is a close error processing function which is performed when the start detection unit 261 detects that the close command becomes a target for execution, if the task including the close command is not specified by the specifying information stored in the specifying information storage unit 565 as a task which is authorized in advance to use the external storage device 160. In the close error processing, the start signal output unit 562 causes the OS which includes the start signal output unit 562 therein to execute predetermined close error processing instead of executing the close command.

The following explains with reference to the drawings, operation of the first modified virtual machine control apparatus having the configuration explained above.

<Operation>

The first modified virtual machine control apparatus performs first modified processing for starting device usage and first modified processing for terminating device usage in substitution for the processing for starting device usage and the processing for terminating device usage performed by the virtual machine control apparatus 100 relating to the first embodiment. The following explains the first modified processing for starting device usage and the first modified processing for terminating device usage.

<First Modified Processing for Starting Device Usage>

The first modified processing for starting device usage is a partial modification of the processing for starting device usage relating to the first embodiment.

Figure 6:
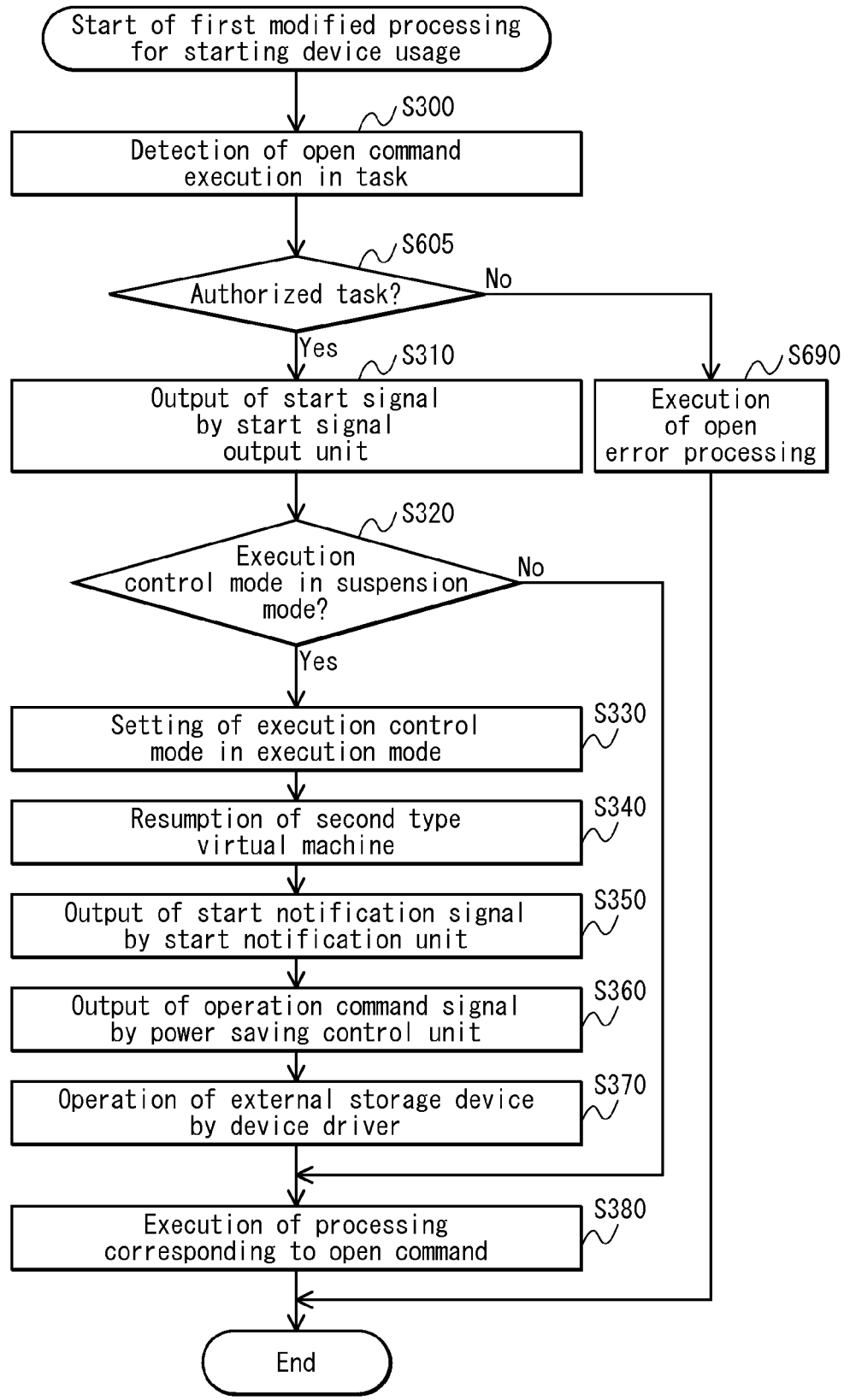
FIG. 6 is a flowchart of first modified processing for starting device usage.

FIG. 6 is a flowchart of the first modified processing for starting device usage.

As shown in FIG. 6, the first modified processing for starting device usage is modified relative to the processing for starting device usage relating to the first embodiment (refer to FIG. 3) by addition of processing in Steps S605 and S690. Therefore, the following explanation focuses on processing in Steps S605 and S690.

Once processing in Step S300 is completed, the start signal output unit 562 checks whether the task which includes the open command is specified by the specifying information storage unit 565 as a task which is authorized in advance to use the external storage device 160 (Step S605).

If in processing in Step S605 the task is a task which is authorized in advance to use the external storage device 160 (Step S605: Yes), the first modified virtual machine control apparatus performs processing in Step S310.

If in the processing in Step S605 the task is not a task which is authorized in advance to use the external storage device 160 (Step S605: No), the start signal output unit 562 causes the first type OS 560 to execute predetermined open error processing instead of executing the open command (Step S690).

Once the processing in Step S690 is completed, the first modified virtual machine control apparatus ends the first modified processing for starting device usage.

<First Modified Processing for Terminating Device Usage>

The first modified processing for terminating device usage is a partial modification of the processing for terminating device usage relating to the first embodiment.

Figure 7:
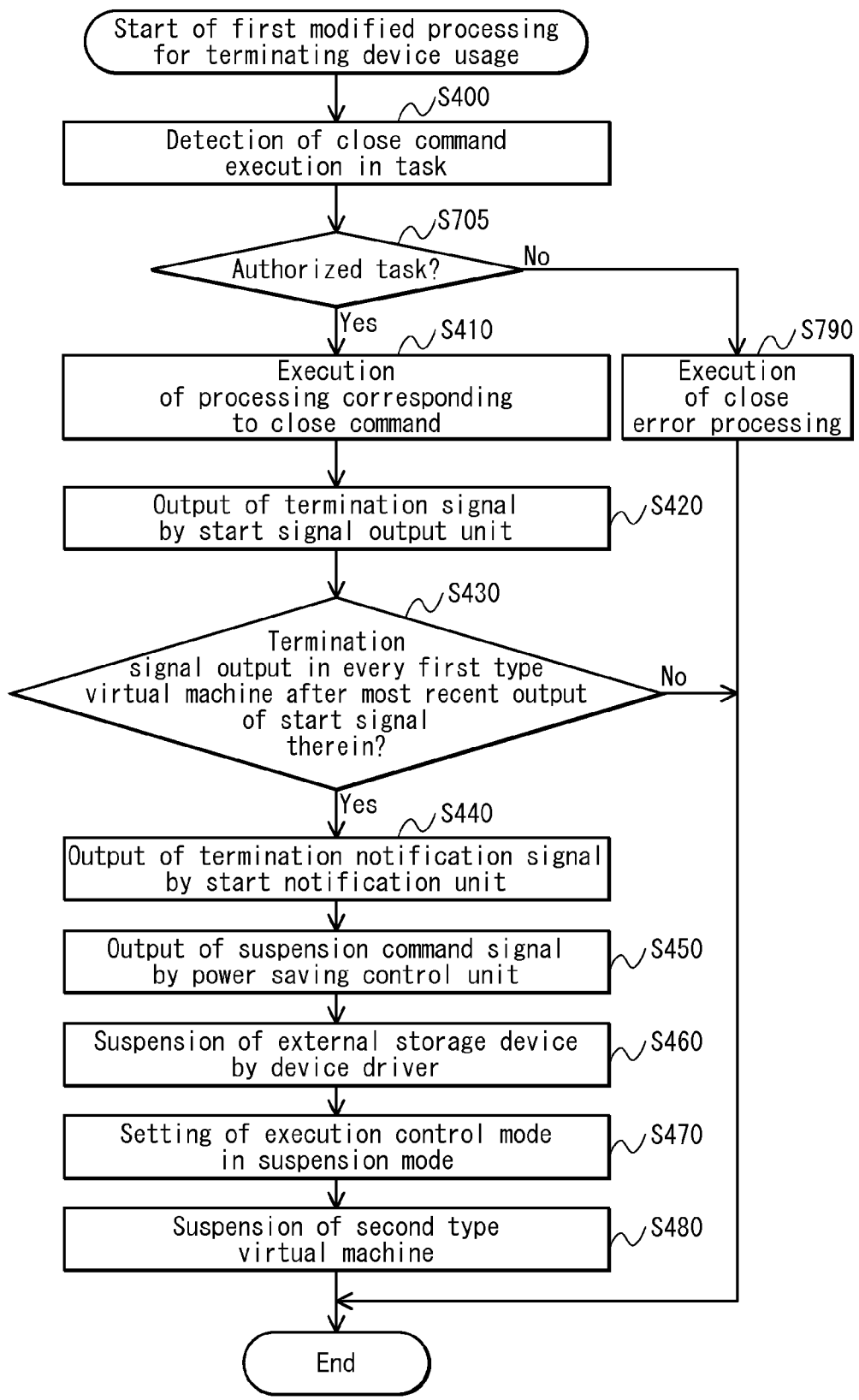
FIG. 7 is a flowchart of first modified processing for terminating device usage.

FIG. 7 is a flowchart of the first modified processing for terminating device usage.

As shown in FIG. 7, the first modified processing for terminating device usage is modified relative to the processing for terminating device usage relating to the first embodiment (refer to FIG. 4) by addition of processing in Steps S705 and S790. Therefore, the following explanation focuses on processing in Steps S705 and S790.

Once processing in Step S400 is completed, the start signal output unit 562 checks whether the task which includes the close command is specified by the specifying information storage unit 565 as a task which is authorized in advance to use the external storage device 160 (Step S705).

If in processing in Step S705 the task is a task which is authorized in advance to use the external storage device 160 (Step S705: Yes), the first modified virtual machine control apparatus performs processing in Step S410.

If in the processing in Step S705 the task is not a task which is authorized in advance to use the external storage device 160 (Step S705: No), the start signal output unit 562 causes the first type OS 560 to execute predetermined close error processing instead of executing the close command (Step S790).

Once the processing in Step S790 is completed, the first modified virtual machine control apparatus ends the first modified processing for terminating device usage.

Third Embodiment

<Overview>

The following explains as one embodiment of the virtual machine control apparatus relating to the present invention, a second modified virtual machine control apparatus which is a partial modification of the virtual machine control apparatus 100 relating to the first embodiment.

The virtual machine control apparatus 100 relating to the first embodiment is an example of a configuration wherein an operation to use the external storage device 160 is detected in the first type virtual machine by the start detection unit 261 detecting that an open command has become a target for execution in a task executed by the first type virtual machine.

In contrast to the above, the second modified virtual machine control apparatus relating to a third embodiment is an example of a configuration wherein, an operation to use the external storage device 160 is detected in the first type virtual machine by detection of an authorized operation, performed by the user of the first type virtual machine, requesting to start usage of the external storage device 160.

Configuration of the second modified virtual machine control apparatus relating to the third embodiment is explained below with reference to the drawings. Explanation focuses on differences compared to the virtual machine control apparatus 100 relating to the first embodiment.

<Configuration>

Hardware configuration of the second modified virtual machine control apparatus is not modified relative to the virtual machine control apparatus 100 relating to the first embodiment, but software executed by the processor 120 is partially modified relative to the virtual machine control apparatus 100.

Figure 8:
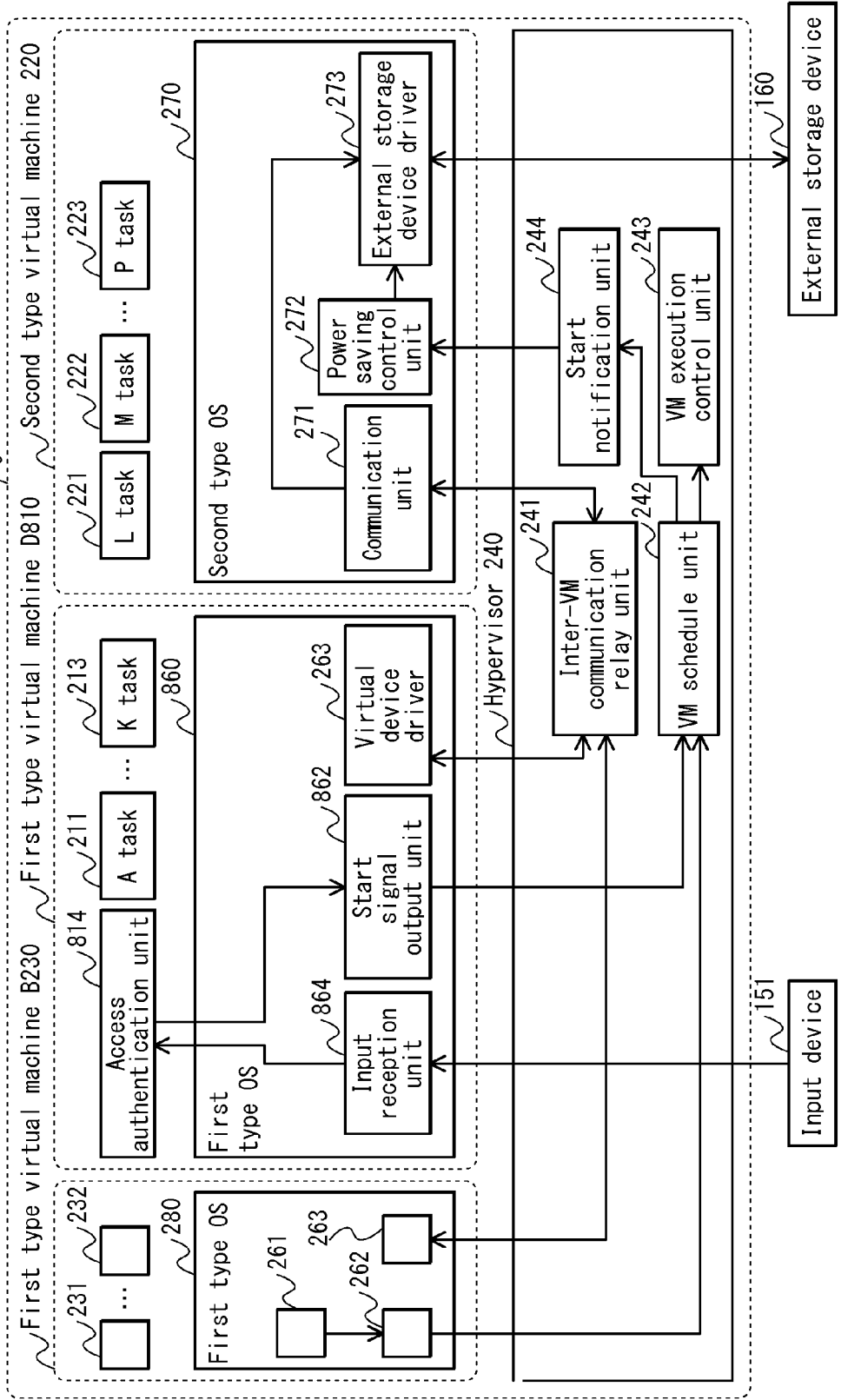
FIG. 8 is a schematic diagram showing a module group 800 which is a target for execution by the processor 120.

FIG. 8 is a schematic diagram showing a module group 800 which is a target for execution by the processor 120.

As shown in FIG. 8, compared to the module group 200 relating to the first embodiment (refer to FIG. 2), the module group 800 is modified by removal of the start detection unit 261, addition of an access authentication unit 814, modification of the start signal output unit 262 to a start signal output unit 862, and modification of the input reception unit 264 to an input reception unit 864. In accordance with the above modifications, the first type OS 560 is modified to a first type OS 860 and the first type virtual machine A210 is modified to a first type virtual machine D810.

The input reception unit 864 is connected to the input device 151 and the access authentication unit 814, and is included in the first type OS 860. The input reception unit 864 has two functions as explained below.

One function is a usage start request reception function of receiving a usage start request, which requests to start usage of the external storage device 160, and outputting the usage start request to the access authentication unit 814. The usage start request is generated through operation of the input device 151 by the user of the first type virtual machine D810.

The other function is a usage termination request reception function of receiving a usage termination request, which requests termination of usage of the external storage device 160, and outputting the usage termination request to the access authentication unit 814. The usage termination request is generated through operation of the input device 151 by the user of the first type virtual machine D810.

The access authentication unit 814 is connected to the input reception unit 864 and the start signal output unit 862, and execution thereof is controlled by the first type OS 860. The access authentication unit 814 has four functions as explained below.

One function is a first specifying information storage function of storing first specifying information for specifying authorized usage start requests. In the explanation below, a usage start request includes a first password and the first specifying information is information for judging whether the first password is authorized.

Another function is a usage start request judgment function of outputting a start request detection signal to the start signal output unit 862. The above function is performed when the input reception unit 864 outputs the usage start request, if the first password included in the usage start request is an authorized password specified by the first specifying information stored in the access authentication unit 814.

Another function is a second specifying information storage function of storing second specifying information for specifying authorized usage termination requests. In the explanation below, a usage termination request includes a second password and the second specifying information is information for judging whether the second password is authorized.

Another function is a usage termination request judgment function of outputting a termination request detection signal to the start signal output unit 862. The above function is performed when the input reception unit 864 outputs the usage termination request, if the second password included in the usage termination request is an authorized password specified by the second specifying information stored in the access authentication unit 814.

The start signal output unit 862 is connected to the access authentication unit 814 and the VM schedule unit 242, and is included in the first type OS 860. The start signal output unit 862 has two functions as explained below.

The first function is a first modified start signal output function of when a start request detection signal is transmitted from the access authentication unit 814, outputting a start signal to the VM schedule unit 242 indicating an operation to start usage of the external storage device 160.

The other function is a first modified termination signal output function of when a termination request detection signal is transmitted from the access authentication unit 814, outputting a termination signal to the VM schedule unit 242 indicating an operation to terminate usage of the external storage device 160.

The following explains with reference to the drawings, operation of the second modified virtual machine control apparatus having the configuration explained above.

<Operation>

The second modified virtual machine control apparatus performs second modified processing for starting device usage and second modified processing for terminating device usage in substitution for the processing for starting device usage and the processing for terminating device usage performed by the virtual machine control apparatus 100 relating to the first embodiment. The following explains the second modified processing for starting device usage and the second modified processing for terminating device usage.

<Second Modified Processing for Starting Device Usage>

The second modified processing for starting device usage is a partial modification of the processing for starting device usage relating to the first embodiment.

Figure 9:
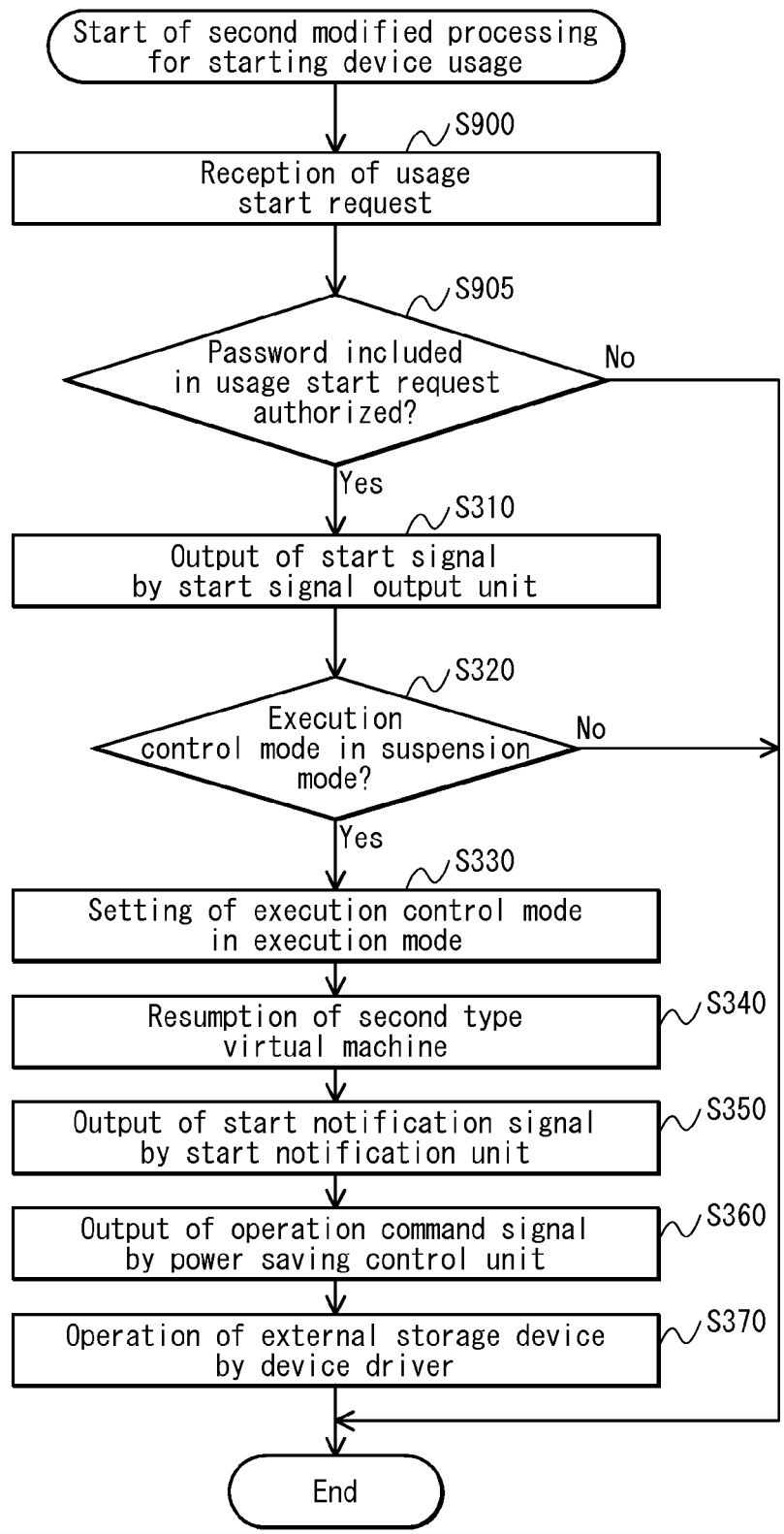
FIG. 9 is a flowchart of second modified processing for starting device usage.

FIG. 9 is a flowchart of the second modified processing for starting device usage.

As shown in FIG. 9, the second modified processing for starting device usage is modified relative to the processing for starting device usage relating to the first embodiment (refer to FIG. 3) by removal of processing in Steps S300 and S380, and addition of processing in Steps S900 and S905. Therefore, the following explanation focuses on processing in Steps S900 and S905.

The second modified processing for starting device usage starts when, while electrical power to the external storage device 160 is set to off, for any first type virtual machine D (in the following explanation the first type virtual machine D is the first type virtual machine D810) a usage start request is performed by the user thereof, requesting to start usage of the external storage device 160.

When the second modified processing for starting device usage starts, the input reception unit 864 receives the usage start request performed by the user (Step S900) and outputs the usage start request to the access authentication unit 814.

When the usage start request is transmitted from the input reception unit 864, the access authentication unit 814 checks whether the first password included in the usage start request is an authorized password specified by the first specifying information stored therein (Step S905).

If in processing in Step S905 the first password included in the usage start request is an authorized password specified by the first specifying information (Step S905: Yes), the second modified virtual machine control apparatus performs processing in Step S310.

Once processing in Step S370 is completed or if in processing in Step S905 the first password included in the usage start request is not an authorized password specified by the first specifying information (Step S905: No), the second modified virtual machine control apparatus ends the second modified processing for starting device usage.

<Second Modified Processing for Terminating Device Usage>

The second modified processing for terminating device usage is a partial modification of the processing for terminating device usage relating to the first embodiment.

Figure 10:
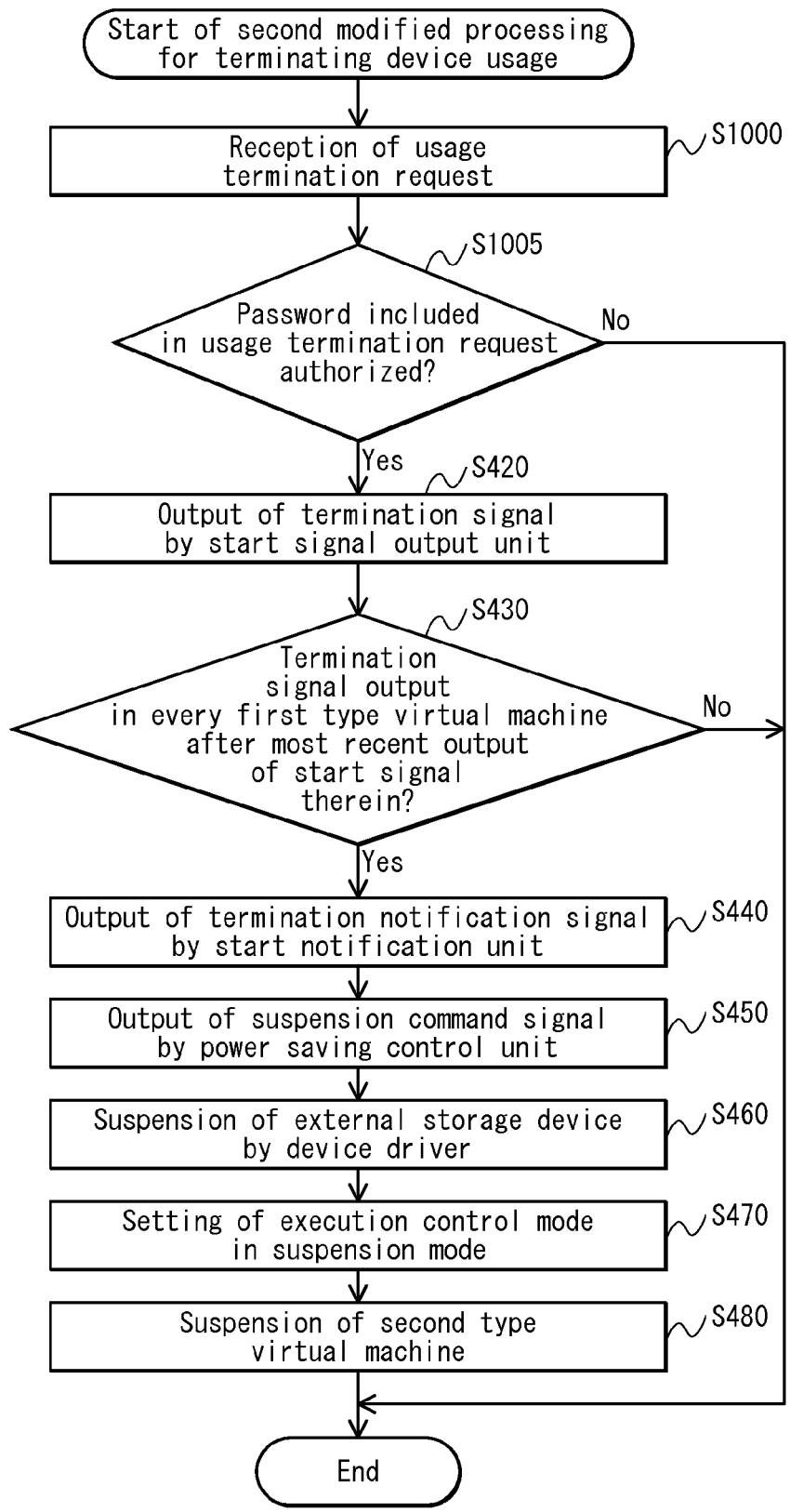
FIG. 10 is a flowchart of second modified processing for terminating device usage.

FIG. 10 is a flowchart of the second modified processing for terminating device usage.

As shown in FIG. 10, the second modified processing for terminating device usage is modified relative to the processing for terminating device usage relating to the first embodiment (refer to FIG. 4) by removal of processing in Steps S400 and S410 and addition of processing in Steps S1000 and S1005. Therefore, the following explanation focuses on processing in Steps S1000 and S1005.

The second modified processing for terminating device usage starts when, while electrical power to the external storage device 160 is set to on and the execution control mode of the second type virtual machine 220 is set in the execution mode, for any first type virtual machine D (in the explanation below the first type virtual machine D is the first type virtual machine D810) a usage termination request is performed by the user thereof, requesting termination of usage of the external storage device 160.

When the second modified processing for terminating device usage starts, the input reception unit 864 receives the usage termination request performed by the user (Step S1000) and outputs the usage termination request to the access authentication unit 814.

When the usage termination request is transmitted from the input reception unit 864, the access authentication unit 814 checks whether the second password included in the usage termination request is an authorized password specified by the second specifying information stored therein (Step S1005).

If in the processing in Step S905 the second password included in the usage termination request is an authorized password specified by the second specifying information (Step S1005: Yes), the second modified virtual machine control apparatus performs processing in Step S420.

If in processing in Step S1005 the second password included in the usage termination request is not an authorized password specified by the second specifying information (Step S1005: No), the second modified virtual machine control apparatus ends the second modified processing for terminating device usage.

Fourth Embodiment

<Overview>

The following explains as one embodiment of the virtual machine control apparatus relating to the present invention, a third modified virtual machine control apparatus which is a partial modification of the second modified virtual machine control apparatus relating to the third embodiment.

The second modified virtual machine control apparatus relating to the third embodiment is an example of a configuration wherein the access authentication unit 814 included in the first type virtual machine judges whether a usage start request performed by the user of the first type virtual machine is an authorized usage start request.

In contrast to the above, the third modified virtual machine control apparatus relating to a fourth embodiment is an example of a configuration wherein an access authentication judgment unit included in the second type virtual machine judges whether a usage start request performed by the user of the first type virtual machine is an authorized usage start request.

Configuration of the third modified virtual machine control apparatus relating to the fourth embodiment is explained below with reference to the drawings. Explanation focuses on differences compared to the second modified virtual machine control apparatus relating to the third embodiment.

<Configuration>

Hardware configuration of the third modified virtual machine control apparatus is not modified relative to the second modified virtual machine control apparatus relating to the third embodiment, but software executed by the processor 120 is partially modified relative to the second modified virtual machine control apparatus.

Figure 11:
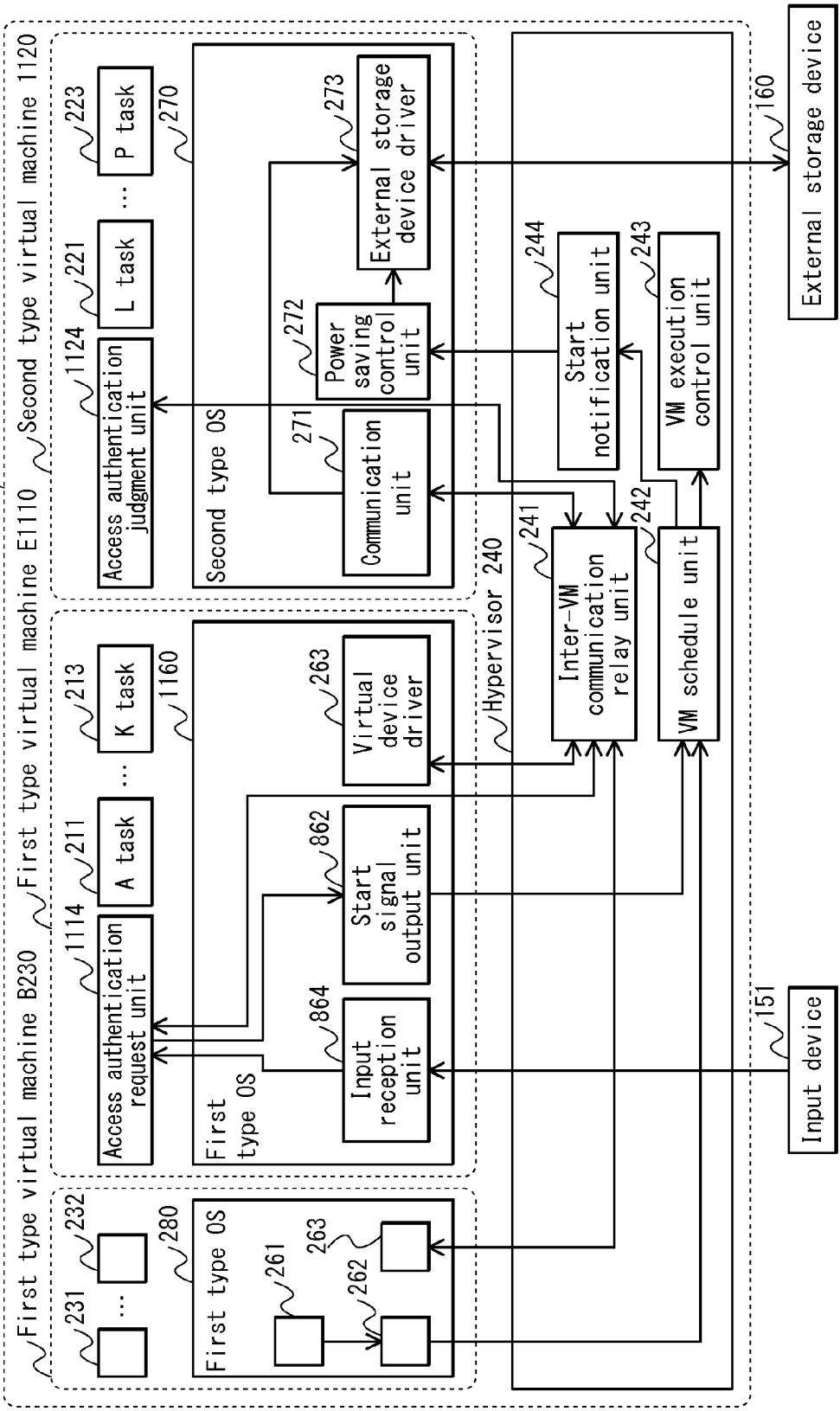
FIG. 11 is a schematic diagram showing a module group 1100 which is a target for execution by the processor 120.

FIG. 11 is a schematic diagram showing a module group 1100 which is a target for execution by the processor 120.

As shown in FIG. 11, the module group 1100 is modified relative to the module group 800 relating to the third embodiment (refer to FIG. 8) by removal of the access authentication unit 814 and addition of an access authentication request unit 1114 and an access authentication judgment unit 1124. In accordance with the above modifications, the first type OS 860 is modified to a first type OS 1160, the first type virtual machine D810 is modified to a first type virtual machine E1110, and the second type virtual machine 220 is modified to a second type virtual machine 1120.

The access authentication request unit 1114 is connected to the input reception unit 864, the start signal output unit 1162 and the inter-VM communication relay unit 241, and execution thereof is controlled by the first type OS 1160. The access authentication request unit 1114 has five functions as explained below.

One function is a usage start request notification function of when a usage start request is transmitted from the input reception unit 864, (i) outputting a start request detection signal to the start signal output unit 862, and (ii) outputting the usage start request to the access authentication judgment unit 1124 via the inter-VM communication relay unit 241 after waiting for a set time T2. The set time T2 is determined in advance as a time at least as long as time required in the third modified processing for starting device usage (refer to FIG. 12) between processing in Step S1200 starting and processing in Step S370 being completed (time required for operation of the external storage device 160). The third modified processing for starting device usage is explained further below.

Another function is a usage termination request notification function of when a usage termination request is transmitted from the input reception unit 864, outputting the usage termination request to the access authentication judgment unit 1124 via the inter-VM communication relay unit 241.

Another function is a start negative judgment processing function of when a start negative judgment signal (explained further below) is transmitted from the access authentication judgment unit 1124 via the inter-VM communication relay unit 241, (i) causing the OS including the access authentication request unit 1114 therein to execute first error processing, which is processing that is predetermined to be executed when the usage start request is not authorized, and (ii) outputting a termination request notification signal to the start signal output unit 862.

Another function is a positive judgment processing function of when a positive judgment signal (explained further below) is transmitted from the access authentication judgment unit 1124 via the inter-VM communication relay unit 241, outputting a termination request notification signal to the start signal output unit 862.

Another function is a termination negative judgment function of when a termination negative judgment signal (explained further below) is transmitted from the access authentication judgment unit 1124 via the inter-VM communication relay unit 241, causing the OS including the access authentication request unit 1114 therein to execute second error processing, which is processing that is predetermined to be executed when the usage termination request is not authorized.

The access authentication judgment unit 1124 is connected to the inter-VM communication relay unit 241 and execution thereof is performed by the second type OS 270. The access authentication judgment unit 1124 has four functions as explained below.

One function is a modified first specifying information storage function of storing first specifying information for specifying authorized usage start requests. In the explanation below, a usage start request includes a first password and the first specifying information is information for judging whether the first password is authorized.

Another function is a first modified usage start request judgment function of when the usage start request is transmitted from the access authentication request unit 1114 via the inter-VM communication relay unit 241, outputting a start negative judgment signal if the first password included in the usage start request is not an authorized password specified by the first specifying information. The start negative judgment signal indicates that the password included in the usage start request is not authorized and is outputted to the access authentication request unit 1114 via the inter-VM communication relay unit 241.

Another function is a modified second specifying information storage function of storing second specifying information for specifying authorized usage termination requests. In the explanation below, a usage termination request includes a second password and the second specifying information is information for judging whether the second password is authorized.

Another function is a first modified usage termination request judgment function of when the usage termination request is transmitted from the access authentication request unit 1114 via the inter-VM communication relay unit 241, (i) if the second password included in the usage termination request is an authorized password specified by the second specifying information, outputting a positive judgment signal to the access authentication request unit 1114 via the inter-VM communication relay unit 241 indicating that the password included in the usage termination request is authorized, and (ii) if the second password included in the usage termination request is not an authorized password specified by the second specifying information, outputting a termination negative judgment signal to the access authentication request unit 1114 via the inter-VM communication relay unit 241 indicating that the password included in the usage termination request is not authorized.

The following explains with reference to the drawings, operation of the third modified virtual machine control apparatus having the configuration explained above.

<Operation>

The third modified virtual machine control apparatus performs third modified processing for starting device usage and third modified processing for terminating device usage in substitution for the second modified processing for starting device usage and the second modified processing for terminating device usage performed by the second modified virtual machine control apparatus relating to the third embodiment. The following explains the third modified processing for starting device usage and the third modified processing for terminating device usage.

<Third Modified Processing for Starting Device Usage>

The third modified processing for starting device usage is a partial modification of the second modified processing for starting device usage relating to the third embodiment.

Figure 12:
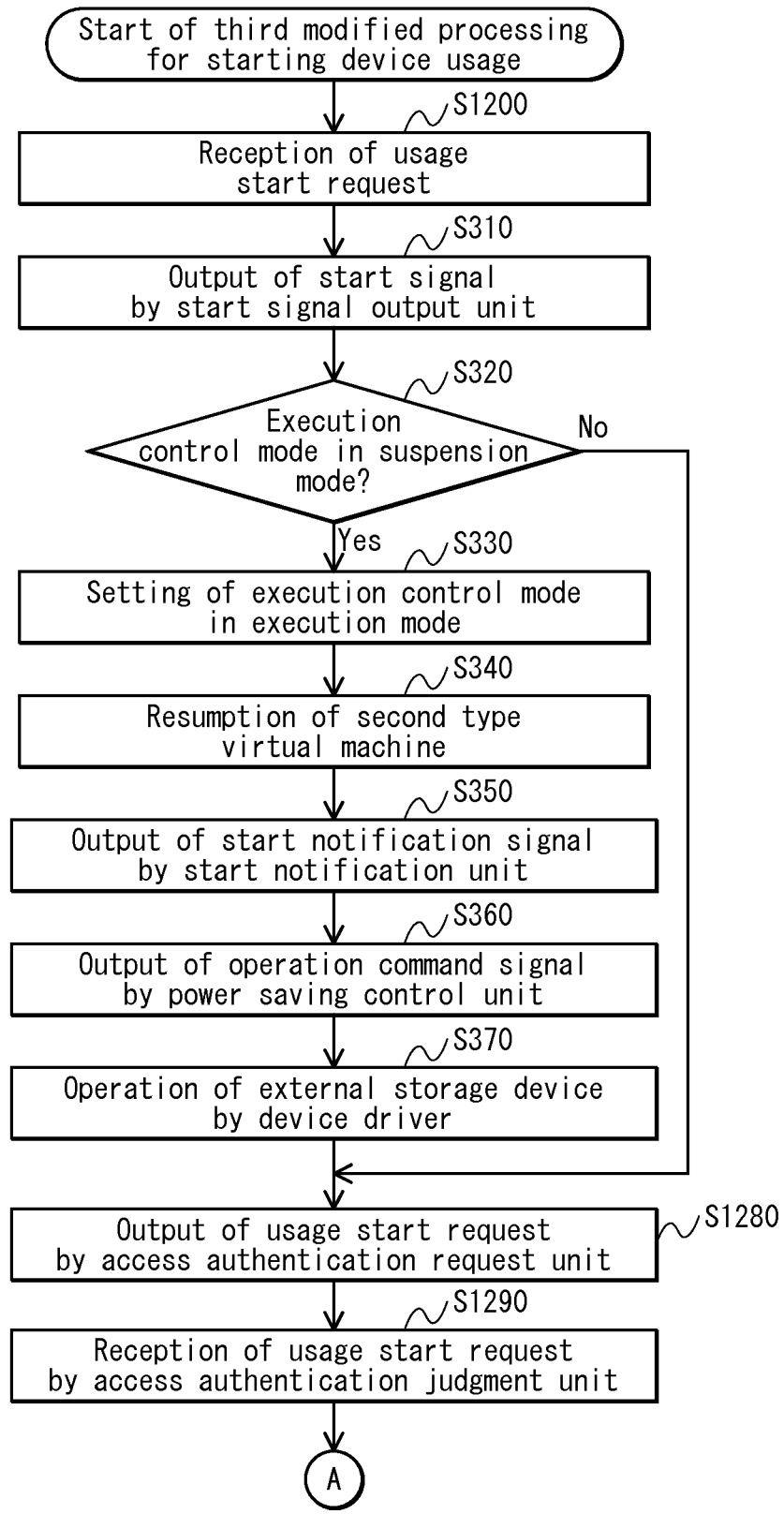
FIG. 12 is a first part of a flowchart of third modified processing for starting device usage.
Figure 13:
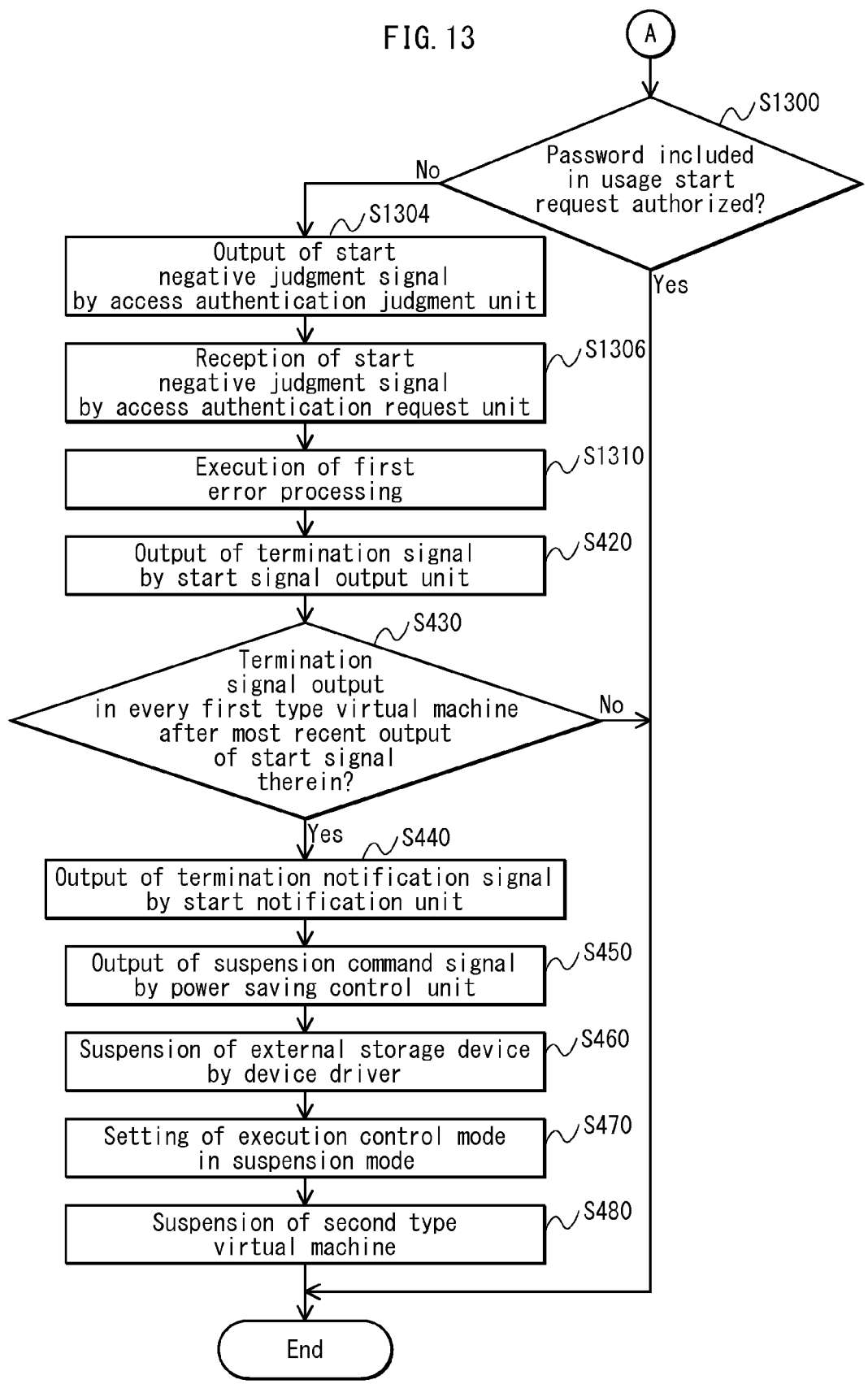
FIG. 13 is a second part of the flowchart of third modified processing for starting device usage.

FIGS. 12 and 13 are respectively first and second parts of a flowchart of the third modified processing for starting device usage.

As shown in FIGS. 12 and 13, the third modified processing for starting device usage is modified relative to the second modified processing for starting device usage relating to the third embodiment (refer to FIG. 9) by removal of processing in Steps S900 and S905, addition of processing in Steps S1200, S1280, S1290 and S1300-S1310, and also with addition of processing in Steps S420-S480 of the processing for terminating device usage relating to the first embodiment (refer to FIG. 4). Therefore, the following explanation focuses on processing in Steps S1200, S1280, S1290, and S1300-S1310.

The third modified processing for starting device usage starts when, while electrical power to the external storage device 160 is set to off, for any first type virtual machine E (in the following explanation the first type virtual machine E is the first type virtual machine E1110), a usage start request is performed by the user thereof, requesting to start usage of the external storage device 160.

When the third modified processing for starting device usage starts, the input reception unit 864 receives the usage start request performed by the user (Step S1200), and outputs the usage start request to the access authentication request unit 1114. Subsequently, the access authentication request unit 1114 outputs a start request detection signal to the start signal output unit 862. Next, the third modified virtual machine control apparatus performs processing in Step S310.

Once processing in Step S370 is completed or if there is a No judgment in Step S320, the access authentication request unit 1114, after waiting for the set time T2 from outputting the start request detection signal to the start signal output unit 862, outputs the usage start request to the access authentication judgment unit 1124 via the inter-VM communication relay unit 241 (Step S1280). The access authentication judgment unit 1124 receives the usage start request outputted from the access authentication request unit 1114 (Step S1290).

Upon reception of the usage start request, the access authentication judgment unit 1124 checks whether the first password included in the usage start request is an authorized password specified by the first specifying information stored therein (Step S1300).

If in the processing in Step S1300 the first password included in the usage start request is not an authorized password specified by the first specifying information (Step S1300: No), the access authentication judgment unit 1124 outputs a start negative judgment signal to the access authentication request unit 1114 via the inter-VM communication relay unit 241, indicating that the password included in the usage start request is not authorized (Step S1304).

Subsequently, the access authentication request unit 1114 receives the start negative judgment signal (S1306), and causes the OS including the access authentication request unit 1114 therein (in other words the first type OS 1160) to execute first error processing, which is predetermined processing for when the usage start request is not authorized (Step S1310). The access authentication request unit 1114 also outputs a termination request notification signal to the start signal output unit 862.

Next, the third modified virtual machine control apparatus performs processing in Step S420.

If in processing in Step S1300 the first password included in the usage start request is an authorized password specified by the first specifying information (S1300: Yes), if there is a No judgment in Step S430, or if processing in Step S480 is completed, the third modified virtual machine control apparatus ends the third modified processing for starting device usage.

<Third Modified Processing for Terminating Device Usage>

The third modified processing for terminating device usage is a partial modification of the second modified processing for terminating device usage relating to the third embodiment.

Figure 14:
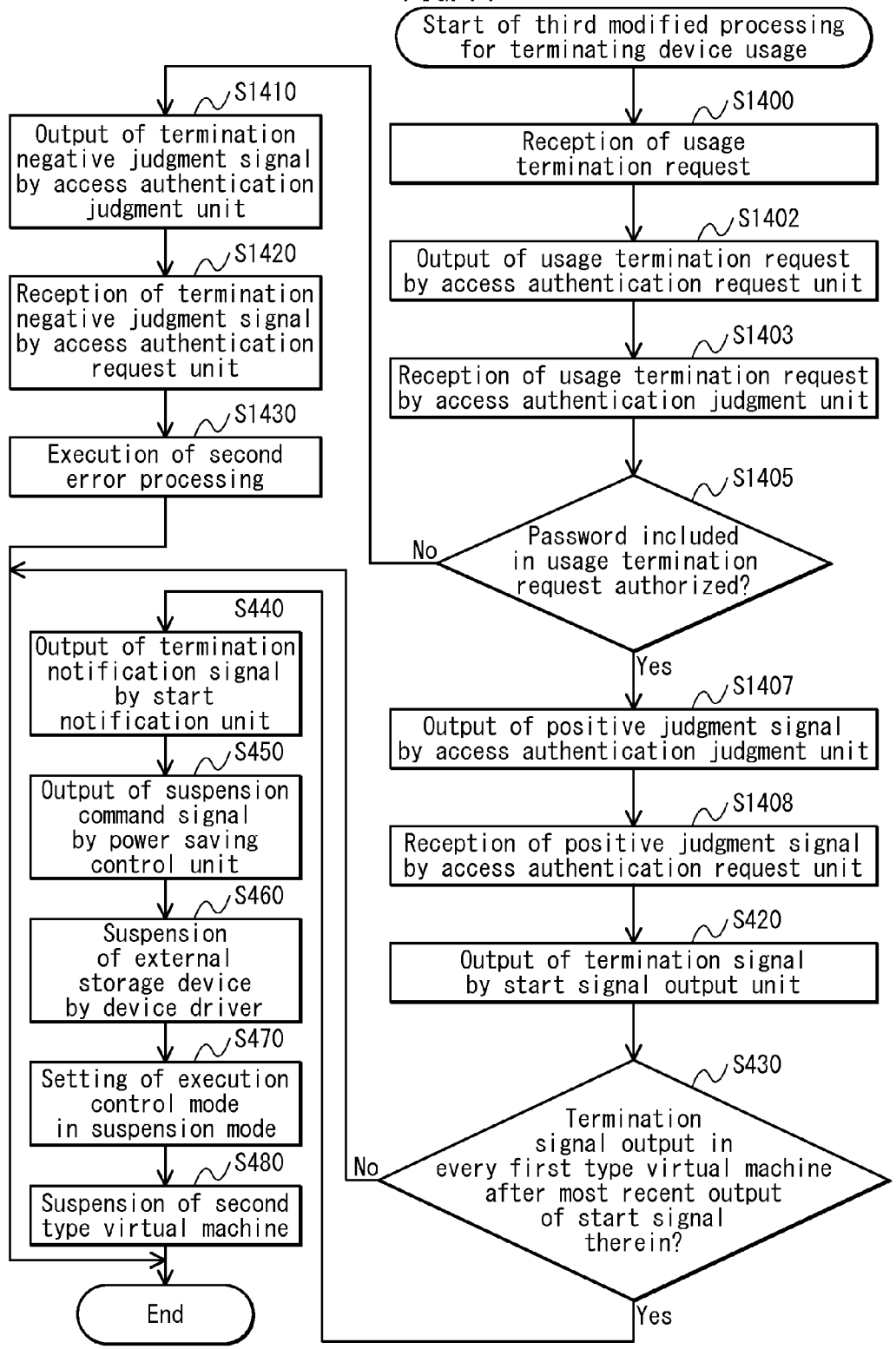
FIG. 14 is a flowchart of third modified processing for terminating device usage.

FIG. 14 is a flowchart of the third modified processing for terminating device usage.

As shown in FIG. 14, the third modified processing for terminating device usage is modified relative to the second modified processing for terminating device usage relating to the third embodiment (refer to FIG. 10) by removal of processing in Steps S1000 and S1005, and addition of processing in Steps S1400-S1430. Therefore, the following explanation focuses on processing in Steps S1400-S1430.

The third modified processing for terminating device usage starts when, while electrical power to the external storage device 160 is set to on and the execution control mode of the second type virtual machine 1120 is set in the execution mode, for any first type virtual machine E (in the following explanation the first type virtual machine E is the first type virtual machine E1110) a usage termination request is performed by the user thereof, requesting termination of usage of the external storage device 160.

When the third modified processing for terminating device usage starts, the input reception unit 864 receives the usage termination request performed by the user (Step S1400), and outputs the usage termination request to the access authentication judgment unit 1124 (Step S1402).

Subsequently, the access authentication judgment unit 1124 receives the usage termination request outputted from the input reception unit 864 (Step S1403), and checks whether the second password included in the usage termination request is an authorized password specified by the second specifying information stored therein (Step S1405).

If in processing in Step S1405 the second password included in the usage termination request is an authorized password specified by the second specifying information (Step S1405: Yes), the access authentication judgment unit 1124 outputs a positive judgment signal to the access authentication request unit 1114 via the inter-VM communication relay unit 241, indicating that the password included in the usage termination request is authorized (Step S1407).

Subsequently, the access authentication request unit 1114 receives the positive judgment signal (Step S1408), and outputs a termination request detection signal to the start signal output unit 862.

Next, the third modified virtual machine control apparatus performs processing in Step S420.

If in processing in Step S1405 the second password included in the usage termination request is not an authorized password specified by the second specifying information (Step S1405: No), the access authentication judgment unit 1124 outputs a termination negative judgment signal to the access authentication request unit 1114 via the inter-VM communication relay unit 241, indicating that the password included in the usage termination request is not authorized (Step S1410).

Subsequently, the access authentication request unit 1114 receives the termination negative judgment signal (Step S1420), and causes the OS including the access authentication request unit 1114 therein (in other words the first type OS 1160) to execute second error processing, which is predetermined processing for when the usage termination request is not authorized (Step S1430).

If the processing in Step S1430 is completed, if there is a No judgment in Step S430, or if processing in Step S480 is completed, the third modified virtual machine control apparatus ends the third modified processing for terminating device usage.

Fifth Embodiment

<Overview>

The following explains as one embodiment of the virtual machine control apparatus relating to the present invention, a fourth modified virtual machine control apparatus which is a partial modification of the third modified virtual machine control apparatus relating to the fourth embodiment.

The third modified virtual machine control apparatus relating to the fourth embodiment is an example of a configuration wherein the start signal output unit 862 included in the first type virtual machine E1110 outputs a termination signal.

In contrast to the above, the fourth modified virtual machine control apparatus relating to a fifth embodiment is an example of a configuration wherein a termination signal output unit included in the second type virtual machine outputs a termination signal.

Configuration of the fourth modified virtual machine control apparatus relating to the fifth embodiment is explained below with reference to the drawings. Explanation focuses on differences compared to the third modified virtual machine control apparatus relating to the fourth embodiment.

<Configuration>

Hardware configuration of the fourth modified virtual machine control apparatus is not modified relative to the third modified virtual machine control apparatus relating to the fourth embodiment, but software executed by the processor 120 is partially modified relative to the third modified virtual machine control apparatus.

Figure 15:
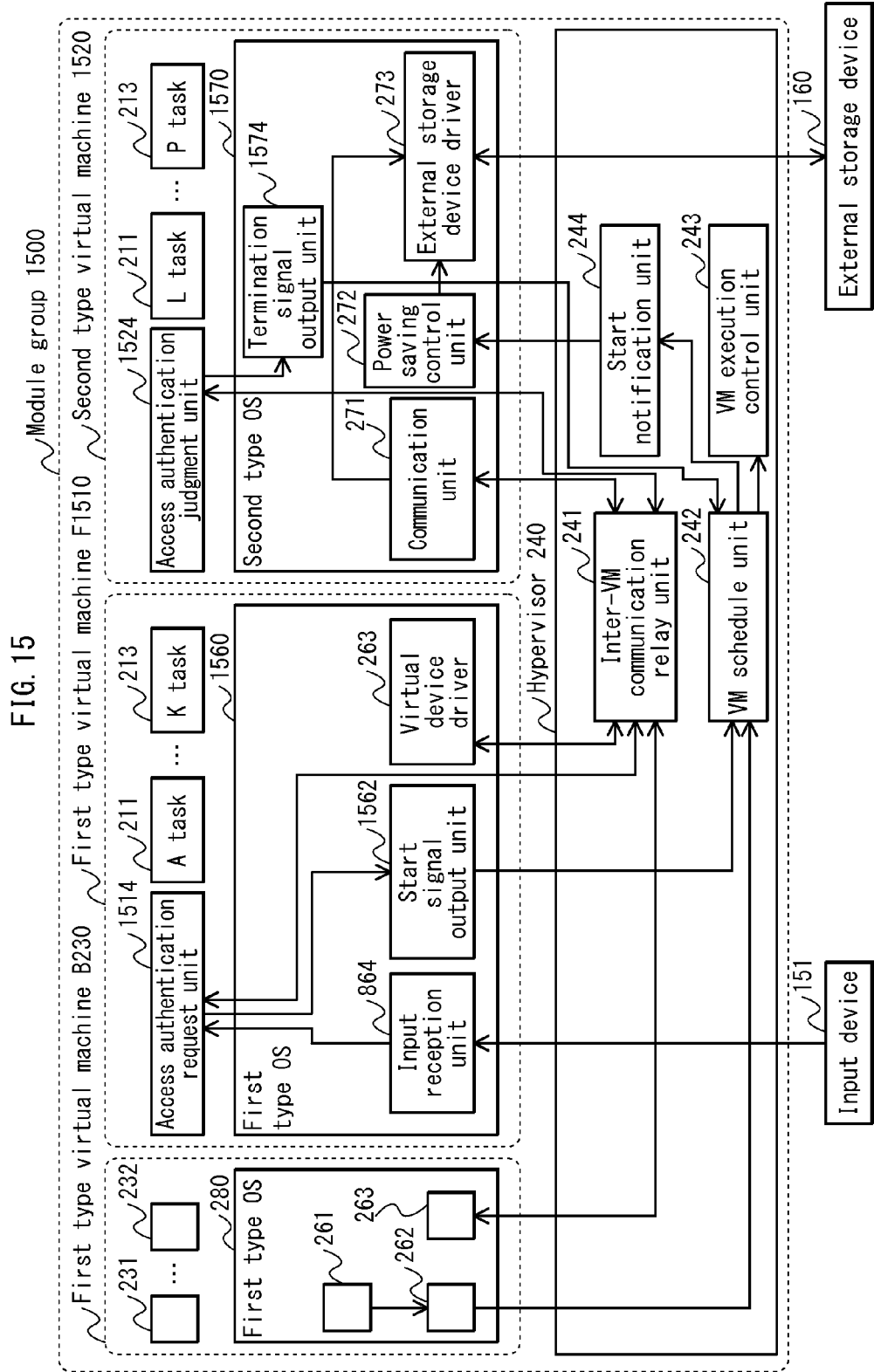
FIG. 15 is a schematic diagram showing a module group 1500 which is a target for execution by the processor 120.

FIG. 15 is a schematic diagram showing a module group 1500 which is a target for execution by the processor 120.

As shown in FIG. 15, the module group 1500 is modified relative to the module group 1100 relating to the fourth embodiment (refer to FIG. 11) by addition of a termination signal output unit 1574, modification of the start signal output unit 862 to a start signal output unit 1562, modification of the access authentication request unit 1114 to an access authentication request unit 1514, and modification of the access authentication judgment unit 1124 to an access authentication judgment unit 1524. In accordance with the above modifications, the first type OS 1160 is modified to a first type OS 1560, the first type virtual machine E1110 is modified to a first type virtual machine F1510, the second type OS 270 is modified to a second type OS 1570, and the second type virtual machine 1120 is modified to a second type virtual machine 1520.

The start signal output unit 1562 is connected to the access authentication request unit 1514 and the VM schedule unit 242, and is included in the first type OS 1560. The start signal output unit 1562 has a function of when a start request detection signal is transmitted from the access authentication request unit 1514, outputting a start signal to the VM schedule unit 242 indicating an operation to start usage of the external storage device 160.

The access authentication request unit 1514 is connected to the input reception unit 864, the start signal output unit 1562 and the inter-VM communication relay unit 241, and execution thereof is controlled by the first type OS 1560. The access authentication request unit 1514 has the usage start request notification function, the usage termination request notification function and the termination negative judgment processing function described for the access authentication request unit 1114 relating to the fourth embodiment, and also has an additional function as explained below.

The additional function is a start negative judgment processing function of when a start negative judgment signal is transmitted from the access authentication judgment unit 1524 via the inter-VM communication relay unit 241, causing the OS including the access authentication request unit 1514 therein to execute first error processing, which is predetermined to be performed when a usage start request is not authorized.

The access authentication request unit 1524 is connected to the inter-VM communication relay unit 241 and the termination signal output unit 1574, and execution thereof is controlled by the second type OS 1570. The access authentication judgment unit 1524 has the modified first specifying information storage function and the modified second specifying information storage function described for the access authentication judgment unit 1124 relating to the fourth embodiment, and also has two additional functions as explained below.

One additional function is a second modified usage start request judgment function of when a usage start request is transmitted from the access authentication request unit 1514 via the inter-VM communication relay unit 241, if the first password included in the usage start request is not an authorized password specified by the first specifying information, (i) outputting a start negative judgment signal to the access authentication request unit 1514 via the inter-VM communication relay unit 241, indicating that the password included in the usage start request is not authorized, and (ii) outputting a termination request notification signal to the termination signal output unit 1574.

The other additional function is a second modified usage termination request judgment function of when a usage termination request is transmitted from the access authentication request unit 1514 via the inter-VM communication relay unit 241, (i) if the second password included in the usage termination request is an authorized password specified by the second specifying information, outputting a termination request notification signal to the termination signal output unit 1574, and (ii) if the second password included in the usage termination request is not an authorized password specified by the second specifying information, outputting a termination negative judgment signal to the access authentication request unit 1514 via the inter-VM communication relay unit 241, indicating that the password included in the usage termination request is not authorized.

The termination signal output unit 1574 is connected to the access authentication judgment unit 1524 and the inter-VM communication relay unit 241, and is included in the second type OS 1570. The termination signal output unit 1574 has a function of when a termination request detection signal is transmitted from the access authentication judgment unit 1524, outputting a termination signal to the VM schedule unit 242, indicating an operation to terminate usage of the external storage device 160.

The following explains with reference to the drawings, operation of the fourth modified virtual machine control apparatus having the configuration explained above.

<Operation>

The fourth modified virtual machine control apparatus performs fourth modified processing for starting device usage and fourth modified processing for terminating device usage in substitution for the third modified processing for starting device usage and the third modified processing for terminating device usage performed by the third modified virtual machine control apparatus relating to the fourth embodiment. The following explains the fourth modified processing for starting device usage and the fourth modified processing for terminating device usage.

<Fourth Modified Processing for Starting Device Usage>

The fourth modified processing for starting device usage is a partial modification of the third modified processing for starting device usage relating to the fourth embodiment.

The fourth modified processing for starting device usage is modified relative to the third modified processing for starting device usage relating to the fourth embodiment (refer to FIGS. 12 and 13) by removal of processing in Steps S420 and S1304-S1310, and addition of processing in Steps S1604-S1620.

Figure 16:
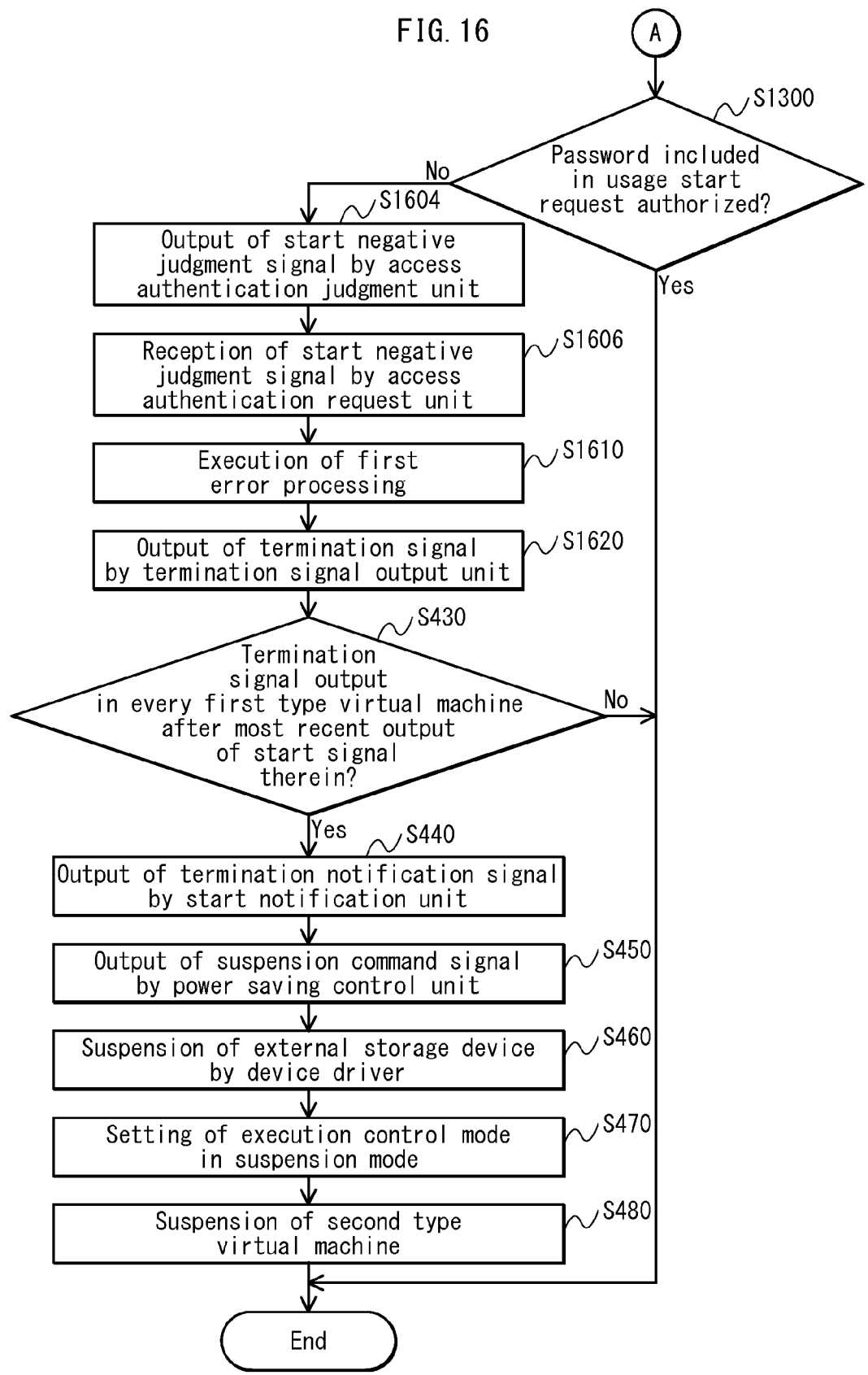
FIG. 16 is a second part of a flowchart of fourth modified processing for starting device usage.

Processing shown in FIG. 12 is not modified for the fourth modified processing for starting device usage, and therefore FIG. 12 is used in addition to FIG. 16 to show a flowchart for the fourth modified processing for starting device usage.

The following explanation focuses on processing in Steps S1604-S1620.

If there is a No judgment in Step S1300, the access authentication judgment unit 1524 outputs a start negative judgment signal to the access authentication request unit 1514 via the inter-VM communication relay unit 241, indicating that the password included in the usage start request is not authorized (Step S1604), and outputs a termination request notification signal to the termination signal output unit 1574.

Subsequently, the access authentication request unit 1514 receives the start negative judgment signal (Step S1606), and causes the OS including the access authentication request unit 1514 therein (in other words the first type OS 1560) to execute first error processing, which is predetermined processing for when a usage start request is not authorized (Step S1610).

When the termination request notification signal is transmitted from the access authentication judgment unit 1524, the termination signal output unit 1574 outputs a termination signal to the VM schedule unit 242, indicating an operation to terminate usage of the external storage device 160 (Step S1620).

When processing in Step S1620 is completed, the fourth modified virtual machine control apparatus performs processing in Step S430.

<Fourth Modified Processing for Terminating Device Usage>

The fourth modified processing for terminating device usage is a partial modification of the third modified processing for terminating device usage relating to the fourth embodiment.

Figure 17:
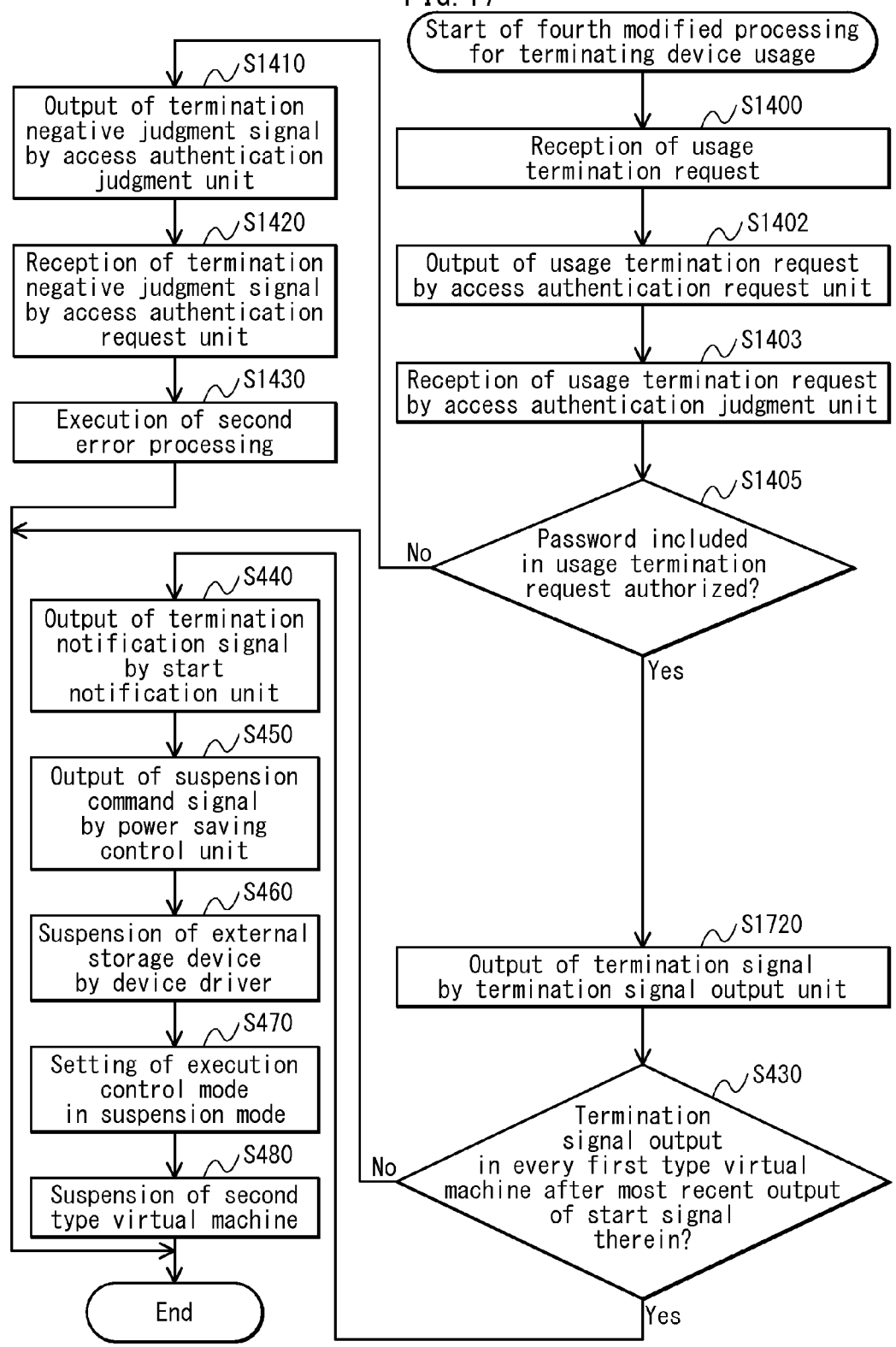
FIG. 17 is a flowchart of fourth modified processing for terminating device usage.

FIG. 17 is a flowchart of the fourth modified processing for terminating device usage.

As shown in FIG. 17, the fourth modified processing for terminating device usage is modified relative to the third modified processing for terminating device usage relating to the fourth embodiment (refer to FIG. 14) by removal of processing in Steps S420, S1407 and S1408, and addition of processing in Step S1720. Therefore, the following focuses on explanation of Step S1720.

If there is a Yes judgment in Step S1405, the access authentication judgment unit 1524 outputs a termination request notification signal to the termination signal output unit 1574. Subsequently, the termination signal output unit 1574 outputs a termination signal to the VM schedule unit 242, indicating an operation to terminate usage of the external storage device 160 (Step S1720).

When processing in Step S1720 is completed, the fourth modified virtual machine control apparatus performs processing in Step S430.

Sixth Embodiment

<Overview>

The following explains as one embodiment of the virtual machine control apparatus relating to the present invention, a fifth modified virtual machine control apparatus which is a partial modification of the third modified virtual machine control apparatus relating to the fourth embodiment.

The third modified virtual machine control apparatus relating to the fourth embodiment is an example of a configuration wherein the first type virtual machine E1110 uses the external storage device 160, which is controlled by the external storage device driver 273 included in the second type virtual machine 1120.

In contrast to the above, the fifth modified virtual machine control apparatus relating to a sixth embodiment is an example of a configuration wherein the second type virtual machine does not include the external storage device driver 273, and the virtual device driver included in the first type virtual machine uses a data storage unit, which is included in the second type virtual machine, through the inter-VM communication relay unit and the communication unit.

Configuration of the fifth modified virtual machine control apparatus relating to the sixth embodiment is explained below with reference to the drawings. Explanation focuses on differences compared to the third modified virtual machine control apparatus relating to the fourth embodiment.

<Configuration>

Hardware configuration of the fifth modified virtual machine control apparatus is not modified relative to the third modified virtual machine control apparatus relating to the fourth embodiment, but software executed by the processor 120 is partially modified relative to the third modified virtual machine control apparatus.

Figure 18:
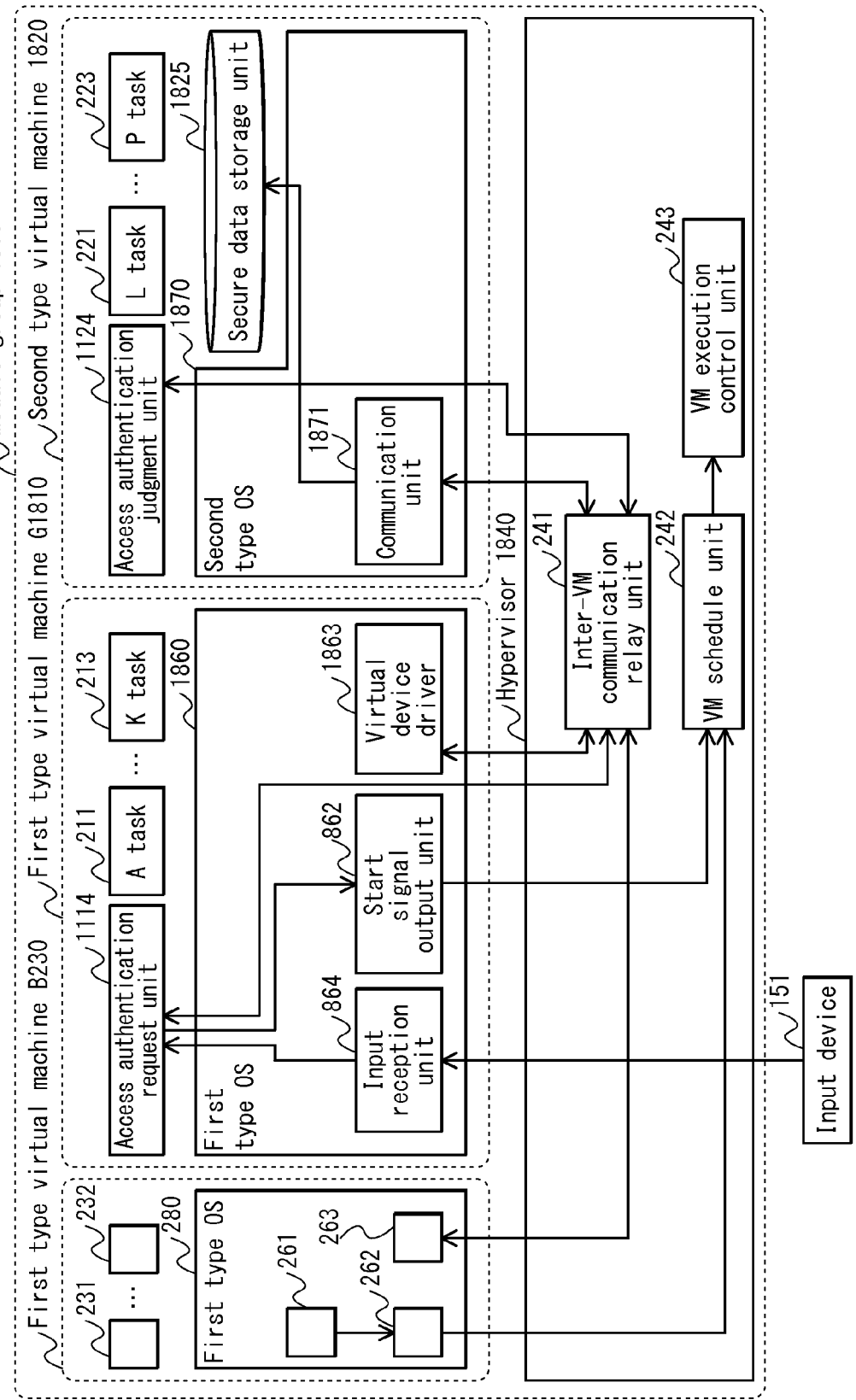
FIG. 18 is a schematic diagram showing a module group 1800 which is a target for execution by the processor 120.

FIG. 18 is a schematic diagram showing a module group 1800 which is a target for execution by the processor 120.

As shown in FIG. 18, the module group 1800 is modified relative to the module group 1100 relating to the fourth embodiment (refer to FIG. 11) by addition of a secure data storage unit 1825, removal of the start notification unit 244, the power saving control unit 272 and the external storage device driver 273, modification of the virtual device driver 263 to a virtual device driver 1863, and modification of the communication unit 271 to a communication unit 1871. In accordance with the above modifications, the first type OS 1160 is modified to a first type OS 1860, the first type virtual machine E1110 is modified to a first type virtual machine G1810, the second type OS 270 is modified to a second type OS 1870, the second type virtual machine 1120 is modified to a second type virtual machine 1820 and the hypervisor 240 is modified to a hypervisor 1840.

The secure data storage unit 1825 is connected to the communication unit 1871 and execution thereof is controlled by the second type OS 1870. The secure data storage unit 1825 has a function of storing data, which is predetermined as data to be kept secret.

The secure data storage unit 1825 is configured as part of a storage region of the memory 130 and is operated as a virtual device.

The virtual device driver 1863 is connected to the inter-VM communication relay unit 241 and is included in the first type OS 1860. The virtual device driver 1863 has two functions as explained below.

One function is a device control signal generation function of when a command for using the secure data storage unit 1825 is executed in any of the tasks executed by the first type virtual machine G1810, outputting a device control signal corresponding to the command to the communication unit 1871 via the inter-VM communication relay unit 241. The device control signal is for controlling the secure data storage unit 1825.

The other function is a device response signal notification function of when a device response signal corresponding to the device control signal is transmitted from the communication unit 1871, outputting the device response signal to the task which is a response target thereof.

The communication unit 1871 is connected to the secure data storage unit 1825 and the inter-VM communication relay unit 241, and execution thereof is controlled by the second type OS 1870. The communication unit 1871 has two functions as explained below.

One function is a modified first communication function of when a device control signal is transmitted from the virtual device driver 1863 via the inter-VM communication relay unit 241, receiving the device control signal and outputting the device control signal to the secure data storage unit 1825.

The other function is a modified second communication function of when a device response signal is transmitted from the secure data storage unit 1825 in response to the device control signal, receiving the device response signal and outputting the device response signal via the inter-VM communication relay unit 241 to the virtual device driver 1863 included in whichever first type virtual machine is a target for the device response signal.

The following explains with reference to the drawings, operation of the fifth modified virtual machine control apparatus having the configuration explained above.

<Operation>

The fifth modified virtual machine control apparatus performs fifth modified processing for starting device usage and fifth modified processing for terminating device usage in substitution for the third modified processing for starting device usage and the third modified processing for terminating device usage performed by the third modified virtual machine control apparatus relating to the fourth embodiment.

The following explains the fifth modified processing for starting device usage and the fifth modified processing for terminating device usage.

<Fifth Modified Processing for Starting Device Usage>

The fifth modified processing for starting device usage is a partial modification of the third modified processing for starting device usage relating to the fourth embodiment.

Figure 19:
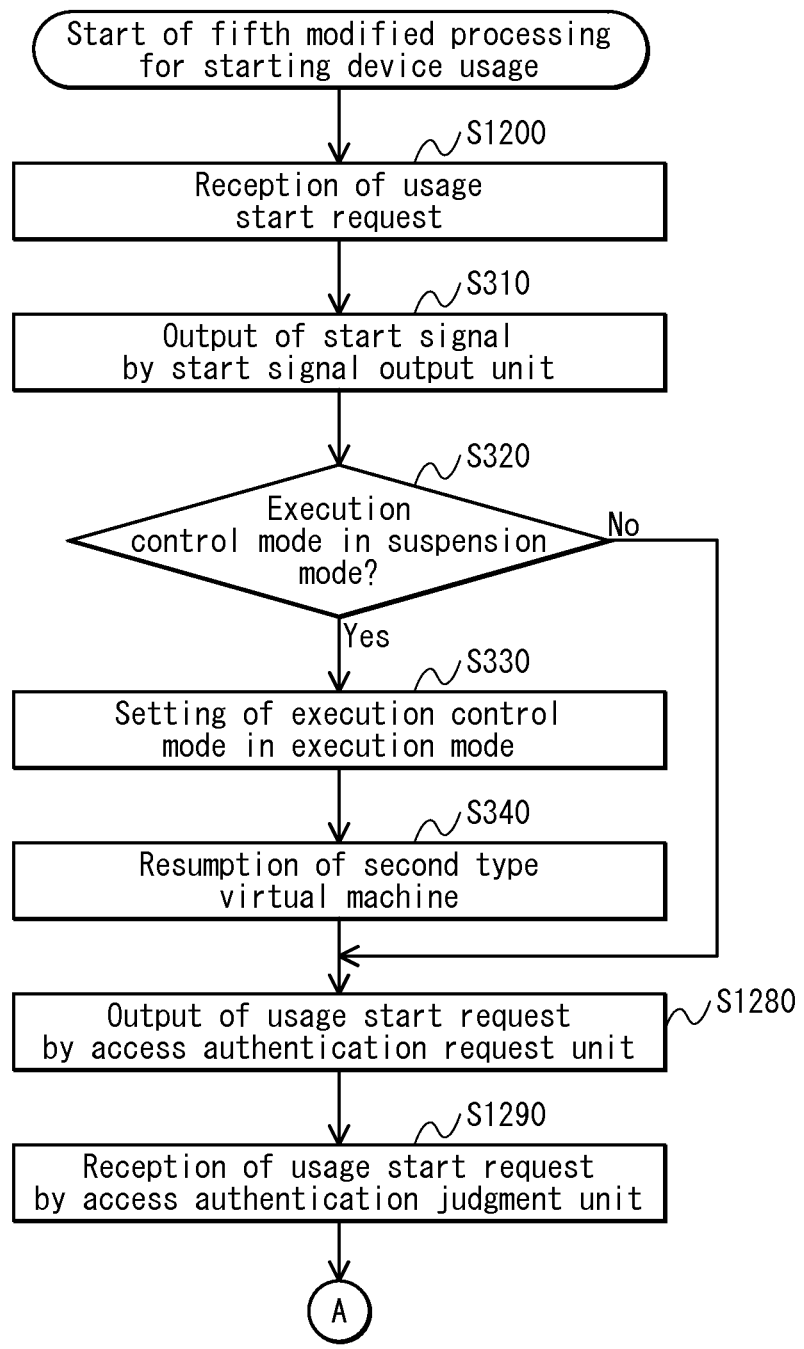
FIG. 19 is a first part of a flowchart of fifth modified processing for starting device usage.
Figure 20:
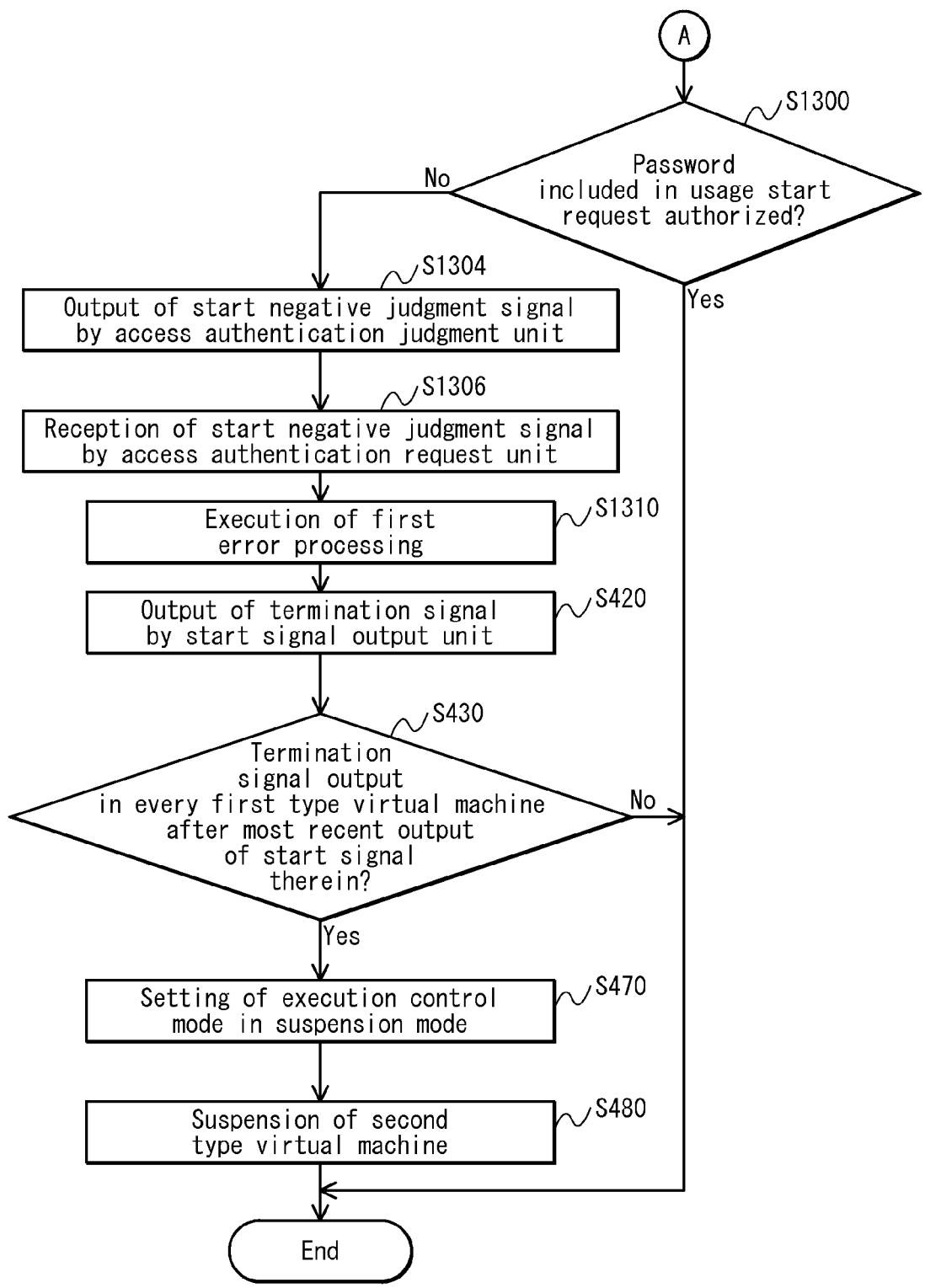
FIG. 20 is a second part of the flowchart of fifth modified processing for starting device usage.

FIGS. 19 and 20 are respectively first and second parts of a flowchart of the fifth modified processing for starting device usage.

As shown in FIGS. 19 and 20, the fifth modified processing for starting device usage is modified relative to the third modified processing for starting device usage relating to the fourth embodiment (refer to FIGS. 12 and 13) by removal of processing in Steps S350-S370 and S440-S460.

<Fifth Modified Processing for Terminating Device Usage>

The fifth modified processing for terminating device usage is a partial modification of the third modified processing for terminating device usage relating to the fourth embodiment.

Figure 21:
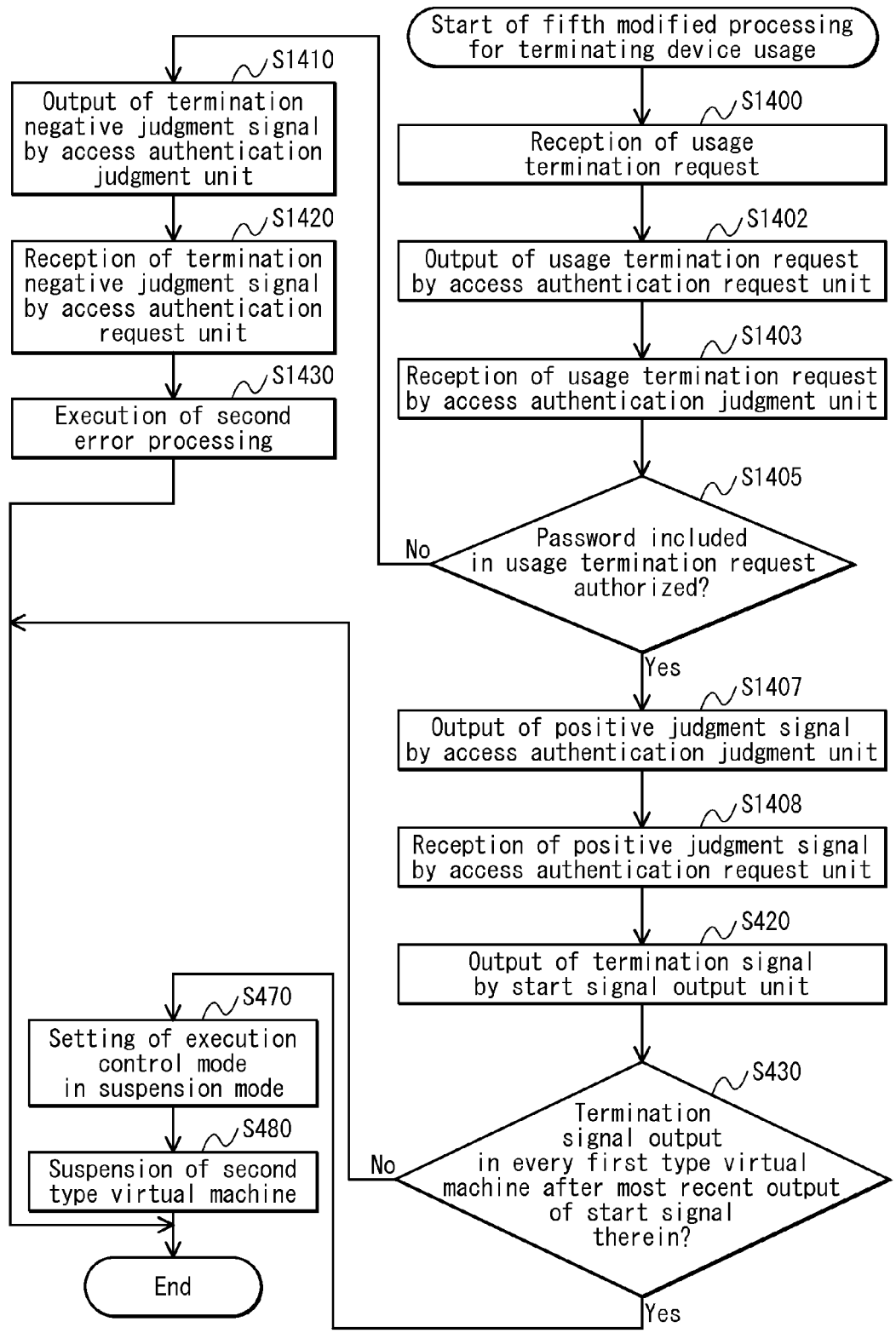
FIG. 21 is a flowchart of fifth modified processing for terminating device usage.

FIG. 21 is a flowchart of the fifth modified processing for terminating device usage.

As shown in FIG. 21, the fifth modified processing for terminating device usage is modified relative to the third modified processing for terminating device usage relating to the fourth embodiment (refer to FIG. 14) by removal of processing in Steps S440-S460.

<Conclusion>

In the fifth modified virtual machine control apparatus having the configuration described above, the virtual device driver 1863 controls the secure data storage unit 1825 through the inter-VM communication relay unit 241 and the communication unit 1871. Consequently, when the execution control mode of the second type virtual machine 1820 is set in the execution mode, any task included in the first type virtual machine G1810 can use data stored in the secure data storage unit 1825 through use of the virtual device driver 1863.

Furthermore, in the fifth modified virtual machine control apparatus the execution control mode of the second type virtual machine 1820 is set in the execution mode during a period from a point in time when the first type virtual machine G1810 starts usage of the secure data storage unit 1825, until a point in time when the first type virtual machine G1810 terminates usage of the secure data storage unit 1825, and the execution control mode of the second type virtual machine 1820 is set in the suspension mode at all times other than during the above period.

Supplementary Explanation

The virtual machine control apparatus relating to the present invention was explained in the first to sixth embodiments above by giving examples of six different virtual machine control apparatuses, each of which is one embodiment of the present invention. The present invention is of course not limited to the embodiments, and may alternatively be modified in various ways as described below.

(1) In the first embodiment an example of a configuration is explained wherein electrical power to the external storage device 160 can be set to either on or off. However, so long as the external storage device 160 can be set in either one mode (referred to below as a first mode) or another mode (referred to below as a second mode), wherein in the first mode electrical power consumption per unit time and processing ability are reduced, and the external storage device 160 cannot be used by the first type virtual machines, and in the second mode the external storage device 160 can be used by the first type virtual machines, the first mode and the second mode need not be achieved by setting electrical power to on or off. In an alternative configuration, the external storage device 160 may either be set in a low power mode in which the external storage device 160 cannot be used by the first type virtual machines, or in a normal mode having higher electrical power consumption per unit time than the low power mode and in which the external storage device 160 can be used by the first type virtual machines.

(2) In the first embodiment an example of a configuration is explained wherein the external device used by the virtual machine control apparatus 100 is the external storage device 160. However, so long as the external device is a device used by one or more first type virtual machines and controlled by the second type virtual machine, the external device is not limited to being the external storage device 160. In another example of configuration, the external device used by the virtual machine control apparatus 100 may be a camera module which is used by each of the first type virtual machines and is controlled by the second type virtual machine.

(3) In the first embodiment the virtual machine control apparatus 100 is an example of a configuration wherein, when any of the first type virtual machines performs an operation to start usage of the external storage device 160, information indicating an operation to start usage of the external storage device 160 by the first type virtual machine is transmitted via the hypervisor 240. However, when the first type virtual machine performs the operation to start usage of the external storage device 160, so long as the information indicating the operation to start usage of the external storage device 160 by the first type virtual machine can be transmitted to the second type virtual machine, the information is not required to be transmitted via the hypervisor 240. In another example of configuration, the information may be transmitted via a module other than the hypervisor 240.

(4) In the first embodiment the virtual machine control apparatus 100 is an example of a configuration wherein the execution control mode of the second type virtual machine 220 is set in the execution mode during the period from the point in time when any of the first type virtual machines starts usage of the external storage device 160 until the point in time when all of the first type virtual machines have terminated usage of the external storage device 160. The execution control mode of the second type virtual machine 220 is set in the suspension mode at all times other than during the above period. However, so long as the execution control mode of the second type virtual machine 220 is set in the execution mode during the period from the point in time when any of the first type virtual machines starts usage of the external storage device 160 until the point in time when all of the first type virtual machines have terminated usage of the external storage device 160, the execution control mode of the second type virtual machine 220 is not required to be set in the suspension mode at all other times other than during the above period. In another example of configuration, the execution control mode of the second type virtual machine 220 may remain constantly in the execution mode.

(5) In the third embodiment the second modified virtual machine control apparatus is an example of a configuration wherein, when an authorized operation requesting termination of usage of the external storage device 160 is performed on the first type virtual machine by the user thereof, an operation to terminate usage of the external storage device 160 is detected in the first type virtual machine. However, so long as the operation to terminate usage of the external storage device 160 is detected in the first type virtual machine in response to some predetermined event, the operation to terminate usage of the external storage device 160 is not required to be detected in the first type virtual machine when the authorized operation requesting termination of usage of the external storage device 160 is performed on the first type virtual machine by the user thereof. In another example of configuration, the operation to terminate usage of the external storage device 160 may be detected in the first type virtual machine when a predetermined period of time passes after an authorized operation requesting to start usage of the external storage device 160 is performed on the first type virtual machine by the user thereof. Alternatively, in another example of configuration the operation to terminate usage of the external storage device 160 may be detected in the first type virtual machine when a close command, which is executed when terminating usage of the external storage device 160, becomes a target for execution in any of the tasks executed by the first type virtual machine.

(6) In the fourth embodiment the third modified virtual machine control apparatus is an example of a configuration wherein, when a usage start request is received from the user of the first type virtual machine while electrical power to the external storage device 160 is set to off, the external storage device 160 is first operated and subsequently, if the judgment as to whether the usage start request is authorized is a negative judgment, electrical power to the external storage device 160 is set to off again. However, when the usage start request is received from the user of the first type virtual machine while electrical power to the external storage device 160 is set to off, so long as electrical power is set to off if the usage start request is not authorized, configuration is not required to be the same as above where the external storage device 160 is first operated after reception of the usage start request, and subsequently electrical power is set to off again if the usage start request is judged not to be authorized. In one example of an alternative configuration, when the usage start request is received from the user of the first type virtual machine while electrical power to the external storage device 160 is set to off, judgment of whether the usage start request is authorized occurs first, and subsequently the external storage device 160 is operated only if the judgment is positive.

Figure 22:
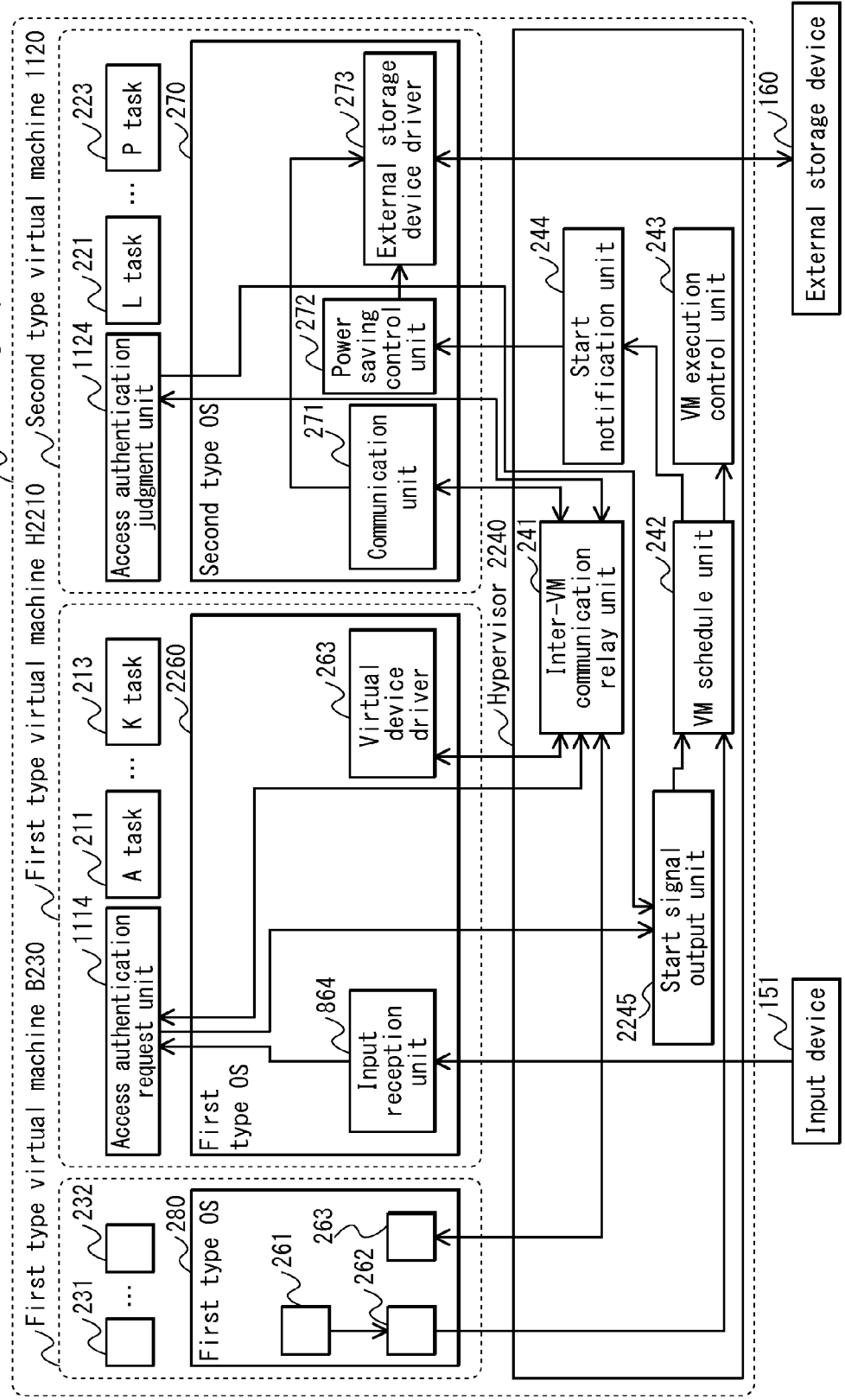
FIG. 22 is a schematic diagram showing a module group 2200 which is a target for execution by the processor 120.

(7) In the fourth embodiment the third modified virtual machine control apparatus is an example of a configuration wherein the start signal output unit 862 is included in the first type OS 1160. However, so long as the same functions are achieved as when the start signal output unit 862 is included in the first type OS 1160, the start signal output unit 862 being included in the first type OS 1160 is not a limitation on the present invention. In one example of an alternative configuration, a module having the same functions as the start signal output unit 862 may be included in the hypervisor. FIG. 22 is a schematic diagram of a module group 2200 which is a target for execution by the processor 120, wherein a start signal output unit 2245 having the same functions as the start signal output unit 862 is included in a hypervisor 2240.

In the same way as described above, the input reception unit 864, the power saving control unit 272 and the like, each included in either the first type OS or the second type OS, may alternatively by included as modules in the hypervisor.

(8) In the third embodiment an example of configuration is explained wherein the usage termination request includes the second password and in processing in Step S1005 of the second modified processing for terminating device usage, a check is performed as to whether the second password included in the usage termination request is an authorized password specified by the second specifying information.

However, in an alternative configuration the usage termination request may not include a password and processing in Step S1005 of the second modified processing for terminating device usage may always be performed the same as when a Yes judgment is performed.

Also, in the fourth embodiment an example of configuration is explained wherein the usage termination request includes the second password and in processing in Step S1405 of the third modified processing for terminating device usage, a check is performed as to whether the second password included in the usage termination request is an authorized password specified by the second specifying information.

However, in an alternative configuration the usage termination request may not include a password and processing in Step S1405 of the third modified processing for terminating device usage may always be performed the same as when a Yes judgment is performed.

Also, in the fifth embodiment an example of configuration is explained wherein the usage termination request includes the second password and in processing in Step S1405 of the fourth modified processing for terminating device usage, a check is performed as to whether the second password included in the usage termination request is an authorized password specified by the second specifying information.

However, in an alternative configuration the usage termination request may not include a password and processing in Step S1405 of the fourth modified processing for terminating device usage may always be performed the same as when a Yes judgment is performed.

Also, in the sixth embodiment an example of configuration is explained wherein the usage termination request includes the second password and in processing in Step S1405 of the fifth modified processing for terminating device usage, a check is performed as to whether the second password included in the usage termination request is an authorized password specified by the second specifying information.

However, in an alternative configuration the usage termination request may not include a password and processing in Step S1405 of the fifth modified processing for terminating device usage may always be performed the same as when a Yes judgment is performed.

(9) The first embodiment is explained for an example of configuration wherein the processor 120, the memory 130, the bus 140, the first I/F 141, the second I/F 142 and the third I/F 143 are integrated into an integrated circuit 110 (refer to FIG. 1). However, so long as the same function as the integrated circuit 110 is achieved, the above configuration elements are not required to be integrated into a single integrated circuit, and may alternatively be integrated into a plurality of different integrated circuits. In general integrated circuits are referred to as one of IC (Integrated Circuit), system LSI (Large Scale Integration), super LSI or ultra LSI based on the level of integration thereof. The method of circuit integration is not limited to LSI, and alternatively may be achieved by a dedicated circuit or a general processor. Further alternatively, after construction of an LSI, a programmable FPGA (Field Programmable Gate Array) or a reconfigurable processor capable of reconfiguring settings and connections between circuit cells in the LSI may be used. Furthermore, if a new circuit integration technique that could replace LSI were to arise from advances in semi-conductor technologies or semi-conductor derived technologies, the new technique could of course be used for the integration of functional blocks and other components. One possibility lies in adaptation of bio-technology.

(10) The following explains configuration, modified examples and effects of a virtual machine control apparatus relating to one embodiment of the present invention.

(a) A virtual machine control apparatus relating to one embodiment of the present invention comprises: a processor configured to use a device settable in either a normal mode or a low power mode having lower electrical power consumption per unit time and lower processing ability than the normal mode; and a memory configured to store therein a program executable by the processor, the virtual machine control apparatus, through execution by the processor of the program stored in the memory, implementing: one or more first type virtual machines; one second type virtual machine; and a hypervisor configured to control execution of each of the first type virtual machines and the second type virtual machine, wherein each of the first type virtual machines includes: a start detection unit configured to detect an operation in the first type virtual machine to start usage of the device; and a start signal output unit configured to output a start signal when the start detection unit detects the operation to start usage of the device, and the second type virtual machine includes a device control unit configured to set the device in the normal mode when, while the device is set in the low power mode, the start signal output unit outputs the start signal.

According to the above configuration of the virtual machine control apparatus relating to the present modified example, when the first type virtual machines performs an operation to start usage of the device while the device is in the low power mode, the control unit included in the second type virtual machine changes the device from the low power mode to the normal mode. Through the above configuration, the device can be kept in the low power mode until the first type virtual machine, which uses the device in the normal mode, starts usage of the device.

Consequently, through the virtual machine control apparatus described above, electrical power consumption can be reduced for the system which includes the virtual machine control apparatus which implements the plurality of virtual machines and the device which is used by the virtual machine control apparatus.

Figure 23:
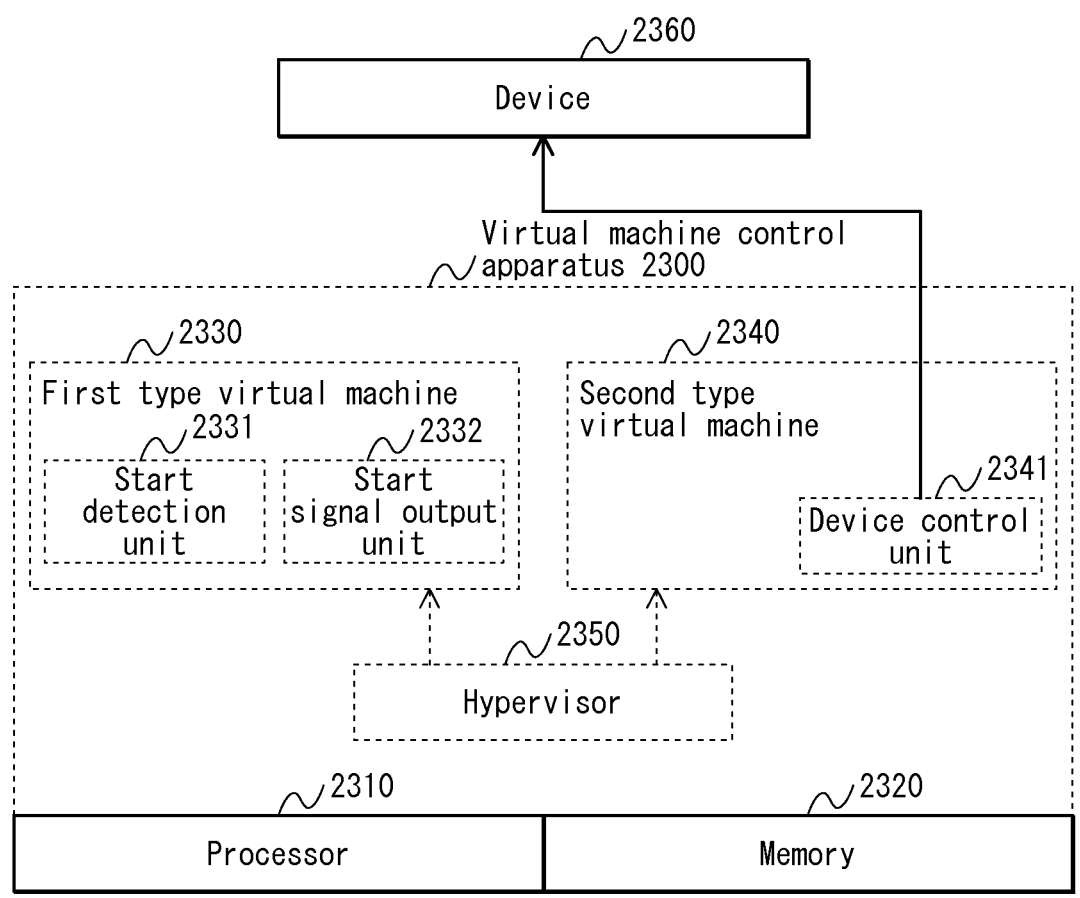
FIG. 23 is a block diagram showing configuration of a virtual machine control apparatus 2300.

FIG. 23 is a block diagram showing configuration of a virtual machine control apparatus 2300 in the above modified example.

As shown in FIG. 23, the virtual machine control apparatus 2300 includes a processor 2310 and a memory 2320 as hardware. Through execution by the processor 2310 of a program stored in the memory 2320, the virtual machine control apparatus 2300 implements a first type virtual machine 2330, a second type virtual machine 2340 and a hypervisor 2350 configured to control execution of the first type virtual machine 2330 and the second type virtual machine 2340. The first type virtual machine 2330 includes a start detection unit 2331 and a start signal output unit 2332. The second type virtual machine 2340 includes a device control unit 2341.

The virtual machine control apparatus 2300 is connected to a device 2360.

The processor 2310 uses the device 2360, and through execution of the program stored in the memory 2320 implements one or more first type virtual machines 2330, the one second type virtual machine 2340 and the hypervisor 2350. The processor 2310 may for example be configured as the processor 120 relating to the first embodiment.

The memory 2320 stores therein the program executable by the processor 2310. The memory 2320 may for example be configured as the memory 130 relating to the first embodiment.

The device 2360 is settable in either a normal mode or a low power mode having lower electrical power consumption per unit time and lower processing ability than the normal mode.

The device 2360 may for example be configured as the external storage device 160 relating to the first embodiment.

The first type virtual machine 2330 is implemented through execution by the processor 2310 of the program stored in the memory 2320. The first type virtual machine 2330 may for example be implemented as the first type virtual machine A210 relating to the first embodiment.

The second type virtual machine 2340 is implemented through execution by the processor 2310 of the program stored in the memory 2320. The second type virtual machine 2340 may for example be implemented as the second type virtual machine 220 relating to the first embodiment.

The hypervisor 2350 is implemented through execution by the processor 2310 of the program stored in the memory 2320. The hypervisor 2350 may for example be implemented as the hypervisor 240 relating to the first embodiment.

The start detection unit 2331 is configured to detect an operation in the first type virtual machine 2330 to start usage of the device 2360. The start detection unit 2331 may for example be implemented as the start detection unit 261 relating to the first embodiment.

The start signal output unit 2332 is configured to output a start signal when the start detection unit 2331 detects the operation in the first type virtual machine 2330 to start usage of the device 2360. The start signal output unit 2332 may for example be implemented as the start signal output unit 262 relating to the first embodiment.

The device control unit 2341 is configured to set the device 2360 in the normal mode when, while the device 2360 is set in the low power mode, the start signal output unit 2332 outputs the start signal. The device control unit 2341 may for example be implemented as the power saving control unit 272 and the external storage device driver 273 relating to the first embodiment.

(b) Alternatively, each of the first type virtual machines may further include: a termination detection unit configured to detect an operation in the first type virtual machine to terminate usage of the device; and a termination signal output unit configured to output a termination signal when the termination detection unit detects the operation to terminate usage of the device, and the device control unit may be further configured to set the device in the low power mode when, while the device is set in the normal mode, for every one of the first type virtual machines in which the start signal output unit included therein outputs the start signal at least once, the termination signal output unit included therein outputs the termination signal after a most recent output of the start signal from the start signal output unit.

Through a configuration such as described above, the device can be changed from the normal mode to the low power mode once usage of the device is terminated by every one of the first type virtual machines which has started usage of the device at some time in the past.

(c) Alternatively, the hypervisor may include: an execution control mode setting unit configured to set an execution control mode of the second type virtual machine in either an execution mode where the second type virtual machine is a target for execution, or a suspension mode where the second type virtual machine is not a target for execution; and an execution control unit configured to perform execution control of the second type virtual machine in accordance with the execution control mode set by the execution control mode setting unit, the execution control mode setting unit may set the execution control mode of the second type virtual machine in the execution mode when, while the execution control mode is set in the suspension mode, the start signal output unit outputs the start signal, the hypervisor may further include a notification unit configured to output a start notification signal to the second type virtual machine when, while the execution control mode of the second type virtual machine is set in the suspension mode by the execution control mode setting unit, the execution control mode setting unit sets the execution control mode in the execution mode due to the start signal output unit outputting the start signal, the device control unit may, through reception of the start notification signal output from the notification unit, detect that while the device is set in the low power mode, the start signal output unit outputs the start signal, the notification unit may be further configured to output a termination notification signal to the second type virtual device when, while the execution control mode of the second type virtual device is set in the execution mode by the execution control mode setting unit, for every one of the first type virtual machines in which the start signal output unit included therein outputs the start signal at least once, the termination signal output unit included therein outputs the termination signal after a most recent output of the start signal from the start signal output unit, the device control unit may, through reception of the termination notification signal, detect that while the device is set in the normal mode, for every one of the first type virtual machines in which the start signal output unit included therein outputs the start signal at least once, the termination signal output unit included therein outputs the termination signal after a most recent output of the start signal from the start signal output unit, and the execution control mode setting unit may set the execution control mode of the second type virtual machine in the suspension mode when the notification unit outputs the termination notification signal.

Through a configuration such as described above, the second type virtual machine can be changed to being a target for execution when, while the second type virtual machine is not a target for execution, any of the first type virtual machines performs an operation to start usage of the device. Also, the second type virtual machine can be changed to not being a target for execution when, while the second type virtual machine is a target for execution, usage of the device is terminated by every one of the first type virtual machines which has started usage of the device at some time in the past.

(d) Alternatively, the device control unit may include a device driver configured to control the device, each of the first type virtual machines may further include a virtual device driver configured to upon execution of a command designated in a program executed by the first type virtual machine and indicating processing using the device, generate a signal for causing the device driver to control the device and output the signal to the second type virtual machine, and the second type virtual machine may further include a transmission unit configured to receive the signal output from the virtual device driver and transmit the signal to the device driver.

Through a configuration such as described above, programs executed by the first type virtual machine are able to use the device through the virtual device driver.

(e) Alternatively, the start detection unit included in the first type virtual machine may, through execution of a usage start command designated in a program executed by the first type virtual machine and indicating processing for starting usage of the device, detect the operation to start usage of the device.

Through a configuration such as described above, the program executed by the first type virtual machine is able to use the device through execution of the usage start command.

(f) Alternatively, each of the first type virtual machines may further include a specifying information storage unit configured to store therein specifying information for specifying a program authorized to use the device, and the start signal output unit may only output the start signal when the program designating the usage start command, execution of which is detected by the start detection unit, is the program specified by the specifying information.

Through a configuration such as described above, use of the device by programs executed by the first type virtual machine can be limited to only programs that are specified by the specifying information.

(g) Alternatively, each of the first type virtual machines may further include: a usage request reception unit configured to receive from a user of the first type virtual machine, a usage request which requests usage of the device; a specifying information storage unit configured to store specifying information therein which specifies an authorized usage request; and a judgment unit configured to perform a judgment as to whether the usage request received by the usage request reception unit is the authorized usage request specified by the specifying information stored in the specifying information storage unit, and the start detection unit may, through performance of a positive judgment by the judgment unit, detect the operation to start usage of the device.

Through a configuration such as described above, programs executed by the first type virtual machine are able to use the device through reception by the usage request reception unit of the usage request performed by the user of the first type virtual machine.

(h) Alternatively, each of the first type virtual machines may further include: a usage request reception unit configured to receive from a user of the first type virtual machine, a usage request which requests usage of the device; and a usage request output unit configured to output the usage request when the usage request reception unit receives the usage request, the start detection unit may, through reception of the usage request by the usage request reception unit, detect the operation to start usage of the device, the second type virtual machine may further include: a specifying information storage unit configured to store specifying information therein which indicates a condition for judging whether a usage request is authorized; and a judgment unit configured to, when the usage request output unit outputs the usage request, perform a judgment as to whether the usage request satisfies the condition indicated in the specifying information stored in the specifying information storage unit, the device control unit may set the device in the low power mode when, while the device is set in the normal mode, the judgment unit performs a negative judgment, the second type virtual machine may further include a judgment signal output unit configured to output a negative judgment signal when the judgment unit performs the negative judgment, and the execution control mode setting unit may set the execution control mode of the second type virtual machine in the suspension mode when, while the execution control mode is set in the execution mode, the judgment signal output unit outputs the negative judgment signal.

Through a configuration such as described above, the judgment unit can be included in the second type virtual machine.

(i) Alternatively, each of the first type virtual machines may further include a virtual device driver configured to upon execution of a command designated for execution in a program executed by the first type virtual machine and indicating processing using the device, generate a signal for controlling the device and output the signal to the second type virtual machine, and the second type virtual machine may further include a transmission unit configured to receive the signal output from the virtual device driver and transmit the signal to the device driver.

Through a configuration such as described above, programs executed by the first type virtual machine are able to use the device through the virtual device driver.

(j) Alternatively, each of the first type virtual machines may further include a virtual device driver configured to upon execution of a command designated for execution in a program executed by the first type virtual machine and indicating processing using the device, generate a signal for controlling the device and output the signal to the second type virtual machine, and the second type virtual machine may further include a transmission unit configured to receive the signal output from the virtual device driver and transmit the signal to the device driver.

Through a configuration such as described above, programs executed by the first type virtual machine are able to use the device through execution of the usage start command.

INDUSTRIAL APPLICABILITY

The present invention is applicable for use in a wide range of devices that use virtual machines.

REFERENCE SIGNS LIST 100 virtual machine control apparatus
110 integrated circuit
120 processor
130 memory
151 input device
152 output device
160 external storage device
200 module group
210 first type virtual machine A
220 second type virtual machine
230 first type virtual machine B
240 hypervisor
241 inter-VM communication relay unit
242 VM schedule unit
243 VM execution control unit
244 start notification unit
260 first type OS
261 start detection unit
262 start signal output unit
263 virtual device driver
264 input reception device
270 second type OS
271 communication unit
272 power saving control unit
273 external storage device driver
280 first type OS

The invention claimed is:

1. A virtual machine control apparatus comprising: a processor configured to use a device settable in either a normal mode or a low power mode having lower electrical power consumption per unit time and lower processing ability than the normal mode; and a memory configured to store therein a program executable by the processor, the virtual machine control apparatus, through execution by the processor of the program stored in the memory, implementing:
one or more first type virtual machines;
one second type virtual machine; and
a hypervisor configured to control execution of each of the first type virtual machines and the second type virtual machine, wherein
each of the first type virtual machines includes its own operating system and tasks controlled by its respective operating system;

the second type virtual machine includes its own operating system and tasks controlled by its operating system;

each of the first type virtual machines includes:
- a start detection unit configured to detect an operation in the first type virtual machine to start usage of the device; and
- a start signal output unit configured to output a start signal when the start detection unit detects the operation to start usage of the device, and the second type virtual machine includes:
- a device control unit configured to set the device in the normal mode when, while the device is set in the low power mode, the start signal output unit outputs the start signal.

2. The virtual machine control apparatus in claim 1, wherein each of the first type virtual machines further includes:
- a termination detection unit configured to detect an operation in the first type virtual machine to terminate usage of the device; and
- a termination signal output unit configured to output a termination signal when the termination detection unit detects the operation to terminate usage of the device, and the device control unit is further configured to set the device in the low power mode when, while the device is set in the normal mode, for every one of the first type virtual machines in which the start signal output unit included therein outputs the start signal at least once, the termination signal output unit included therein outputs the termination signal after a most recent output of the start signal from the start signal output unit.

3. The virtual machine control apparatus in claim 2, wherein the hypervisor includes:
- an execution control mode setting unit configured to set an execution control mode of the second type virtual machine in either an execution mode where the second type virtual machine is a target for execution, or a suspension mode where the second type virtual machine is not a target for execution; and
- an execution control unit configured to perform execution control of the second type virtual machine in accordance with the execution control mode set by the execution control mode setting unit, the execution control mode setting unit sets the execution control mode of the second type virtual machine in the execution mode when, while the execution control mode is set in the suspension mode, the start signal output unit outputs the start signal, the hypervisor further includes
- a notification unit configured to output a start notification signal to the second type virtual machine when, while the execution control mode of the second type virtual machine is set in the suspension mode by the execution control mode setting unit, the execution control mode setting unit sets the execution control mode in the execution mode due to the start signal output unit outputting the start signal, the device control unit, through reception of the start notification signal output from the notification unit, detects that while the device is set in the low power mode, the start signal output unit outputs the start signal, the notification unit is further configured to output a termination notification signal to the second type virtual device when, while the execution control mode of the second type virtual device is set in the execution mode by the execution control mode setting unit, for every one of the first type virtual machines in which the start signal output unit included therein outputs the start signal at least once, the termination signal output unit included therein outputs the termination signal after a most recent output of the start signal from the start signal output unit, the device control unit, through reception of the termination notification signal, detects that while the device is set in the normal mode, for every one of the first type virtual machines in which the start signal output unit included therein outputs the start signal at least once, the termination signal output unit included therein outputs the termination signal after a most recent output of the start signal from the start signal output unit, and the execution control mode setting unit sets the execution control mode of the second type virtual machine in the suspension mode when the notification unit outputs the termination notification signal.

4. The virtual machine control apparatus in claim 3, wherein the device control unit includes a device driver configured to control the device, each of the first type virtual machines further includes
- a virtual device driver configured to upon execution of a command designated in a program executed by the first type virtual machine and indicating processing using the device, generate a signal for causing the device driver to control the device and output the signal to the second type virtual machine, and the second type virtual machine further includes
- a transmission unit configured to receive the signal output from the virtual device driver and transmit the signal to the device driver.

5. The virtual machine control apparatus in claim 4, wherein the start detection unit, through execution of a usage start command designated in a program executed by the first type virtual machine and indicating processing for starting usage of the device, detects the operation to start usage of the device.

6. The virtual machine control apparatus in claim 5, wherein each of the first type virtual machines further includes
- a specifying information storage unit configured to store therein specifying information for specifying a program authorized to use the device, and the start signal output unit only outputs the start signal when the program designating the usage start command, execution of which is detected by the start detection unit, is the program specified by the specifying information.

7. The virtual machine control apparatus in claim 4, wherein each of the first type virtual machines further includes:
- a usage request reception unit configured to receive from a user of the first type virtual machine, a usage request which requests usage of the device;
- a specifying information storage unit configured to store specifying information therein which specifies an authorized usage request; and
- a judgment unit configured to perform a judgment as to whether the usage request received by the usage request reception unit is the authorized usage request specified by the specifying information stored in the specifying information storage unit, and the start detection unit, through performance of a positive judgment by the judgment unit, detects the operation to start usage of the device.

8. The virtual machine control apparatus in claim 4, wherein
each of the first type virtual machines further includes:
a usage request reception unit configured to receive from a user of the first type virtual machine, a usage request which requests usage of the device; and
a usage request output unit configured to output the usage request when the usage request reception unit receives the usage request,
the start detection unit, through reception of the usage request by the usage request reception unit, detects the operation to start usage of the device,
the second type virtual machine further includes:
a specifying information storage unit configured to store specifying information therein which indicates a condition for judging whether a usage request is authorized; and
a judgment unit configured to, when the usage request output unit outputs the usage request, perform a judgment as to whether the usage request satisfies the condition indicated in the specifying information stored in the specifying information storage unit,
the device control unit sets the device in the low power mode when, while the device is set in the normal mode, the judgment unit performs a negative judgment,
the second type virtual machine further includes
a judgment signal output unit configured to output a negative judgment signal when the judgment unit performs the negative judgment, and
the execution control mode setting unit sets the execution control mode of the second type virtual machine in the suspension mode when, while the execution control mode is set in the execution mode, the judgment signal output unit outputs the negative judgment signal.

9. The virtual machine control apparatus in claim 3, wherein
each of the first type virtual machines further includes
a virtual device driver configured to upon execution of a command designated for execution in a program executed by the first type virtual machine and indicating processing using the device, generate a signal for controlling the device and output the signal to the second type virtual machine, and
the second type virtual machine further includes
a transmission unit configured to receive the signal output from the virtual device driver and transmit the signal to the device driver.

10. The virtual machine control apparatus in claim 9, wherein
the start detection unit, through execution of a command designated in a program executed by the first type virtual machine and indicating processing for starting usage of the device, detects the operation to start usage of the device.

11. A virtual machine control method for controlling a virtual machine control apparatus comprising: a processor configured to use a device settable in either a normal mode or a low power mode having lower electrical power consumption per unit time and lower processing ability than the normal mode; and a memory configured to store therein a program executable by the processor, the virtual machine control apparatus, through execution by the processor of the program stored in the memory, implementing:
one or more first type virtual machines;
one second type virtual machine; and
a hypervisor configured to control execution of each of the first type virtual machines and the second type virtual machine, wherein
each of the first type virtual machines includes its own operating system and tasks controlled by its respective operating system;
the second type virtual machine includes its own operating system and tasks controlled by its operating system;
the virtual machine control method comprising:
a start detection step of any one of the first type virtual machines detecting an operation therein to start usage of the device;
a start signal output step of the first type virtual machine outputting a start signal when the operation is detected in the detection step, and
a device control step of the second type virtual machine controlling to set the device in the normal mode when, while the device is set in the low power mode, the start signal is output in the start signal output step.

12. A virtual machine control apparatus comprising: a processor configured to use a device settable in either a normal mode or a low power mode having lower electrical power consumption per unit time and lower processing ability than the normal mode; and a memory configured to store therein a program executable by the processor, the virtual machine control apparatus, through execution by the processor of the program stored in the memory, implementing:
one or more first type virtual machines;
one second type virtual machine; and
a hypervisor configured to control execution of each of the first type virtual machines and the second type virtual machine, wherein:
each of the first type virtual machines includes:
a start detection unit configured to detect an operation in the first type virtual machine to start usage of the device; and
a start signal output unit configured to output a start signal when the start detection unit detects the operation to start usage of the device, and
the second type virtual machine includes:
a device control unit configured to set the device in the normal mode when, while the device is set in the low power mode, the start signal output unit outputs the start signal,
each of the first type virtual machines further includes:
a termination detection unit configured to detect an operation in the first type virtual machine to terminate usage of the device; and
a termination signal output unit configured to output a termination signal when the termination detection unit detects the operation to terminate usage of the device, and
the device control unit is further configured to set the device in the low power mode when, while the device is set in the normal mode, for every one of the first type virtual machines in which the start signal output unit included therein outputs the start signal at least once, the termination signal output unit included therein outputs the termination signal after a most recent output of the start signal from the start signal output unit.

13. A virtual machine control apparatus comprising: a processor for use with a device settable in either a normal mode or a low power mode having lower electrical power consumption per unit time and lower processing ability than the normal mode; and a memory having stored therein a program executable by the processor, the virtual machine control apparatus, through execution by the processor of the program stored in the memory, implementing:
- one or more first type virtual machines;
- one second type virtual machine; and
- a hypervisor that controls execution of each of the first type virtual machines and the second type virtual machine, wherein
- each of the first type virtual machines includes its own operating system and tasks controlled by its respective operating system;
- the second type virtual machine includes its own operating system and tasks controlled by its operating system;
- each of the first type virtual machines includes:
  - a start detector that detects an operation in the first type virtual machine to start usage of the device; and
  - a start signal output that outputs a start signal when the start detection unit detects the operation to start usage of the device, and
- the second type virtual machine includes:
  - a device controller that sets the device in the normal mode when, while the device is set in the low power mode, the start signal output outputs the start signal.

* * * * *